US006252682B1

United States Patent
Baba et al.

(10) Patent No.: US 6,252,682 B1
(45) Date of Patent: *Jun. 26, 2001

(54) DOCUMENT SENSING DEVICE FOR AN IMAGE FORMING APPARATUS

(75) Inventors: Nobuyuki Baba; Koichi Kudo; Sumiaki Aoki, all of Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,201

(22) Filed: May 1, 1998

(30) Foreign Application Priority Data

| May 1, 1997 | (JP) | 9-128092 |
| Jun. 16, 1997 | (JP) | 9-175247 |
| Jul. 30, 1997 | (JP) | 9-205081 |

(51) Int. Cl.[7] .................................................. H04N 1/04
(52) U.S. Cl. ........................ 358/488; 358/480; 358/482
(58) Field of Search ........................... 358/374, 488, 358/406, 481, 494, 480, 482, 483; 250/559.36, 236

(56) References Cited

U.S. PATENT DOCUMENTS

| 4,778,272 | * | 10/1988 | Asakura | 356/372 |
| 4,899,227 | * | 2/1990 | Yamada | 358/452 |
| 5,214,294 | * | 5/1993 | Toyofuku | 250/561 |
| 5,289,262 | * | 2/1994 | McConnell | 356/375 |
| 5,321,273 | * | 6/1994 | Kamiyama et al. | 356/386 |
| 5,479,274 | * | 12/1995 | Baba et al. | 250/548 |
| 5,729,024 | | 3/1998 | Baba et al. . | |
| 5,818,062 | * | 10/1998 | Baba et al. | 250/559.36 |

FOREIGN PATENT DOCUMENTS 8-179442     7/1996    (JP) .

OTHER PUBLICATIONS

Abstract of European patent appln. No. 98–107943.7 filed Apr. 30, 1998.

* cited by examiner

Primary Examiner—Cheukfan Lee
(74) Attorney, Agent, or Firm—Dickstein Shapiro Morin & Oshinsky LLP

(57) ABSTRACT

A document sensing device for an image forming apparatus of the present invention is capable of sensing a document stably without being influenced by disturbing light, e.g., light ascribable to fluorescent lamps or similar illuminators illuminating a room. According to one aspect of die invention, optical elements are held by a jig rotatable about an optical axis. According to another aspect of the invention, a light receiving means or a photosensor means has at least four light-sensitive regions.

20 Claims, 34 Drawing Sheets

$(B1+B2)-(A1+A2) \approx 0$ $(B1+B2)-(A1+A2) \approx 0$ $(B1+B2)-(A1+A2)<0$ $(B1+B2)-(A1+A2)>0$

HOLOGRAM SCANNER

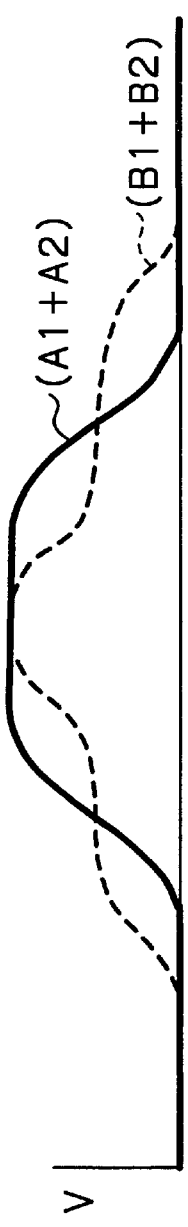
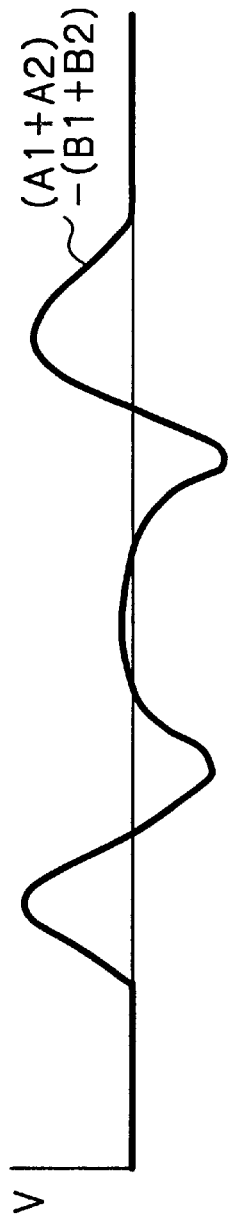
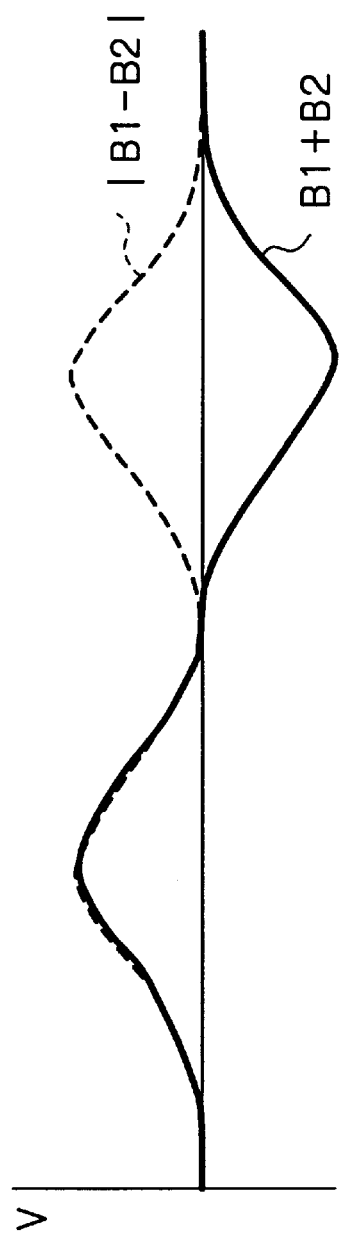
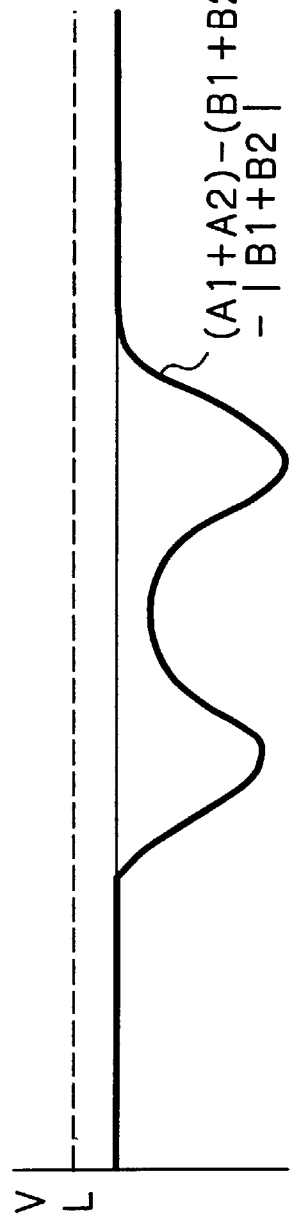
Fig. 29A
Fig. 29B
Fig. 29C
Fig. 29D

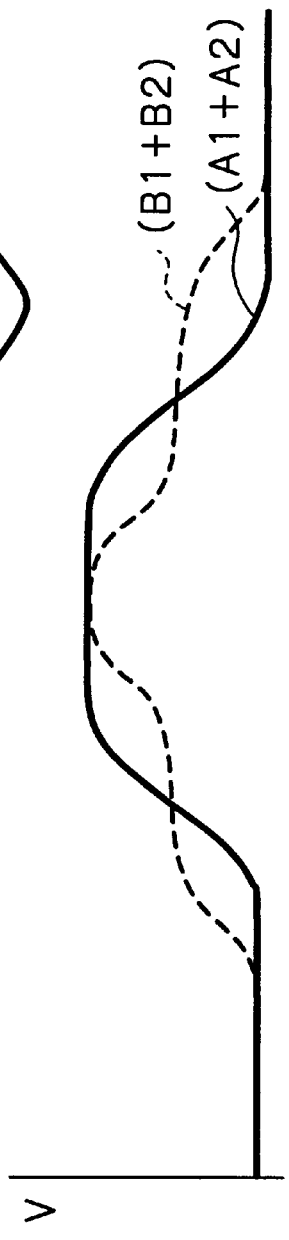
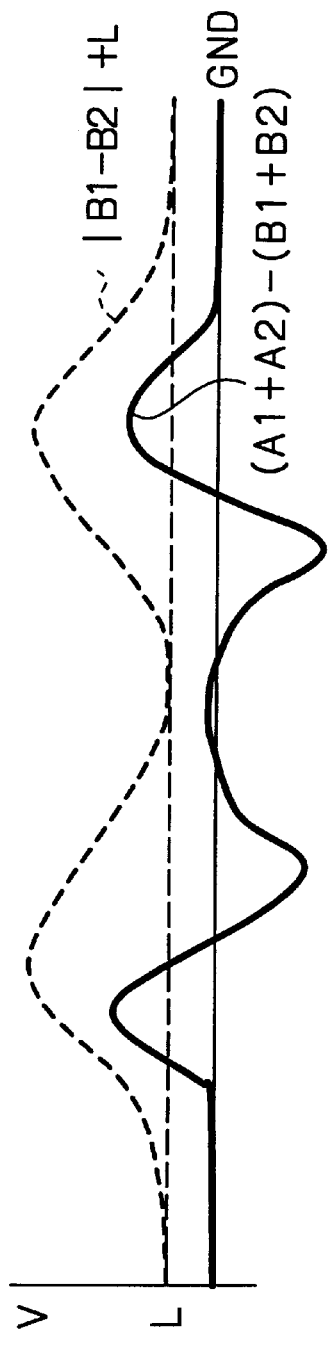
Fig. 31A
Fig. 31B
Fig. 31C

DOCUMENT SENSING DEVICE FOR AN IMAGE FORMING APPARATUS

BACKGROUND OF THE INVENTION

The present invention relates to a document sensing device for an electrophotographic copier, printer, facsimile apparatus or similar image forming apparatus and, more particularly, to a document sensing device capable of reading the position and/or the size of a document with improved accuracy.

A copier, for example, has a function of automatically reading a document laid on its glass platen and selecting a sheet of the same size as the document. For this purpose, the copier includes a document sensing device for sensing the size of a document. The document sensing device has been proposed in various forms in the past. Japanese Patent Laid-Open Publication No. 7-77746, for example, teaches a document position sensor using a hologram disk and an LED (Light Emitting Diode). To reduce the influence of noise and enhance accurate reading, the document position sensor forms a beam spot of substantial size on a document. Light issuing from the LED is restricted and then incident to the hologram disk and diffracted for scanning a document. However, the problem with this scheme is that the wavelength of the light issuing from the LED spreads over a certain width. As a result, the hologram disk whose diffraction angle is noticeably dependent on wavelength causes the scanning beam to spread. This lowers the sensing accuracy of the device although reducing the influence of noise ascribable to dust and stains on a document.

An LED customarily included in the document sensing device has an emission area as broad as 0.3 mm×0.3 mm. Therefore, when light issuing from the LED is incident to a document via lenses and mirrors and then reflected toward a photodiode (PD), or photoelectric transducer, the beam width increases and therefore requires the PD to have a broad light-sensitive area. Consequently, much disturbing light is also incident to the PD and lowers the S/N (Signal-to-Noise) ratio.

Moreover, a copier or similar image forming apparatus including the document sensing device is usually operated in a room illuminated by, e.g., fluorescent lamps. In this condition, it is likely that the document sensing device fails to sense a document accurately due to disturbing light ascribable to the lamps.

Technologies relating to the present invention are also disclosed in, e.g., Japanese Patent Laid-Open Publication Nos. 5-58511 and 6-242391.

SUMMARY OF THE INVENTION

It is therefore an object of the present invention to provide a document sensing device capable of enhance accurate document sensing without increasing the cost.

It is another object of the present invention to provide a document sensing device capable of reducing the number of parts and therefore the cost.

It is still another object of the present invention to provide a document sensing device capable of sensing a document stably without being influenced by disturbing light ascribable to fluorescent lamps or similar illuminators.

In accordance with the present invention, a document sensing device includes a light source implemented by LED. A shaping element shapes light issuing from the light source to thereby form a narrow beam. A scanning section steers the beam with a rotating or a vibrating reflection member to thereby cause the beam to scan a document. An optical isolator separates light reflected from the document and returning an illumination path on an optical path. A condenser condenses the light separated by the optical isolator. A photoelectric transducer transforms the light condensed by the condenser to a corresponding electric signal. Au edge sensing device senses, based on the electric signal and the timing for scanning the document, the edges of the document to thereby determine the size and position of the document.

Also, in accordance with the present invention, a document sensing device includes a transparent glass platen to be loaded with a document, a cover plate openably covering the document laid on the glass platen, a scanning section for causing a Light beam to sequentially scan the underside of the cover plate and then the document, a light receiving portion for outputting, in response to light reflected from the document, a signal corresponding to the length of an incidence path, and a signal processing circuit for electrically processing the signal output from the light receiving portion to thereby binarize the signal The light receiving portion has a photosensor having at least four light-sensitive regions arranged symmetrically with respect to the center of the photosensor, a condenser adjoining the front of the photosensor on the optical axis of the photosensor for condensing incident light to a single point, and either a cylindrical lens or an optical wedge. The signal processing circuit includes at least one circuit for determining that signals derived from at least two symmetrical ones of the light-sensitive regions of the photosensor are different in strength.

Further, in accordance with the present invention, a document sensing device includes a light emitting portion for emitting light, and a light receiving portion for receiving a reflection from a document illuminated by the light issuing from the light emitting portion. The light receiving portion includes a condenser for condensing the reflection, a cylindrical lens to which light output from the condenser is incident, and a light receiving device for receiving light output from the cylindrical lens. The light receiving device has at least four light-sensitive regions so divided by lines as to be symmetrical with respect to the center of the light receiving device. The lines are perpendicular or parallel to a direction in which the light scans the document.

BRIEF DESCRIPTION OF THE DRAWINGS

The above and other objects, features and advantages of the present invention will become apparent from the following detailed description taken with the accompanying drawings in which:

FIGS. 29A–29D show waveforms representative of signals appearing in the circuitry of FIG. 28 in the condition of FIG. 25;

FIGS. 31A–31C show waveforms representative of signals appearing in the circuitry of FIG. 30 in the condition of FIG. 25;

In the drawings, identical reference numerals denote identical structural elements.

DESCRIPTION OF THE PREFERRED EMBODIMENTS

Figure 1:
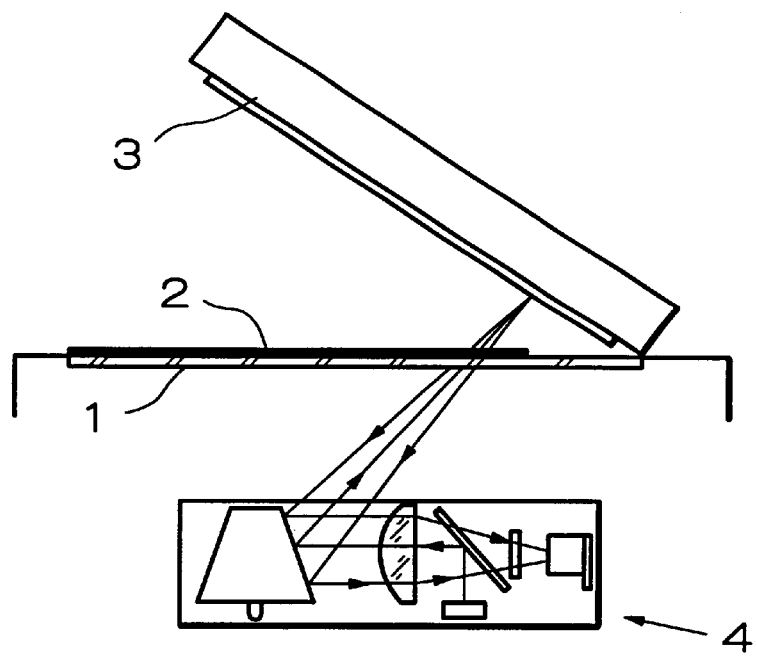
FIG. 1 shows a copier including a conventional document sensing device using an astigmatism method.
Figure 2:
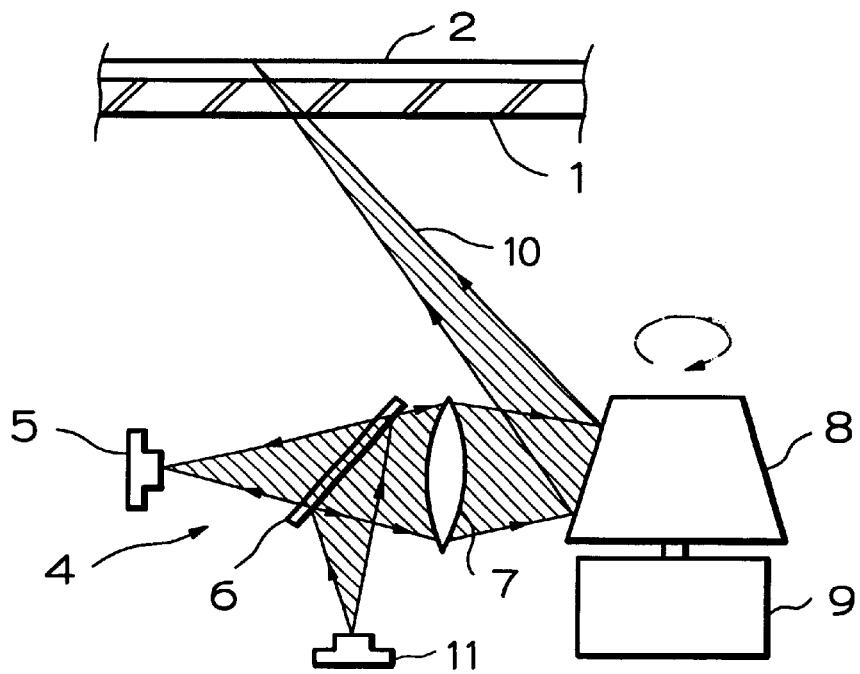
FIG. 2 shows the document sensing device of FIG. 1 more specifically.

To better understand the present invention, brief reference will be made to an image forming apparatus including a conventional document sensing device. As shown in FIG. 1, the image forming apparatus, e.g., a copier includes a glass platen I to be loaded with a document 2. A cover plate 3 openably covers the top of the document 2 laid on the glass platen 1. The document sensing device, labeled 4, senses the edges of the document 2 in order to determine the position and size of the document 2. As shown in FIG. 2 in detail, in the document sensing device, a reflection from the document 2 illuminated is incident to a PD or photoelectric transducer 5. Specifically, light issuing from an LED or similar Light source 11 is reflected rightward, as viewed in FIG. 2, by a half-mirror or optical isolator 6 and then incident to a rotatable mirror 8 via a lens 7. The rotatable mirror 8 is made up of a plurality of mirrors and rotated by a motor 9 at a preselected period. As a result, the light incident to the mirror 8 via the lens 7 scans the surface of the document 2 as a scanning beam 10.

Figure 3:
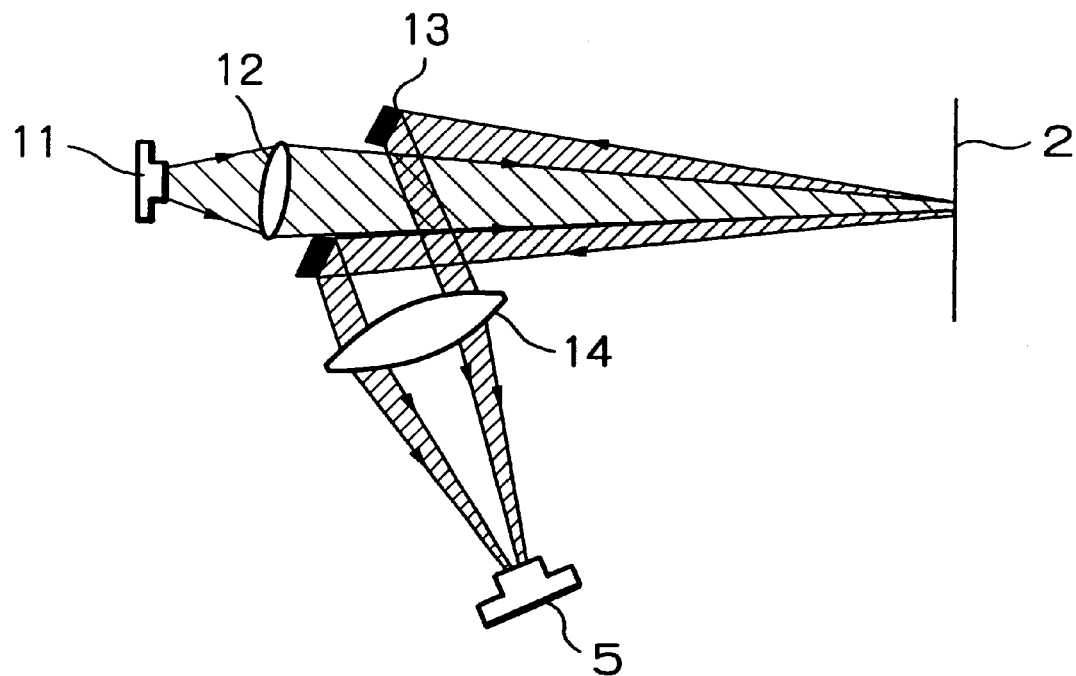
FIG. 3 shows a conventional document sensing device using an LED.

FIG. 3 shows another conventional document sensing device. As shown, the light issuing from the LED 11 is condensed by a lens 12 and then incident to the document 2 via a hole formed in the center of the mirror 13. The resulting reflection from the document 2 is reflected by the mirror 13 toward a condenser 14 and then incident to the PD 5. The problem with this configuration is that the area of the hole formed in the mirror 13 should be increased with an increase in the size of the tight to issue from the LED 11. This reduces the area of the mirror 13 available for the propagation of the reflection from the document 2 to the PD 5 and is therefore apt to obstruct the efficient use of the reflection To increase the above area of the mirror 13, the mirror 13 and therefore the entire image forming apparatus must be increased in size.

A preferred embodiment of the document sensing device in accordance with the present invention will be described hereinafter. Briefly, the illustrative embodiment is characterized in that a light source is implemented by an LED having a small emission area. While a collimator lens adjoining the light source usually has a focal distance of, e.g., about 5 mm, the distance to a document is about 250 mm. When use is made of the conventional LED having an emission area of about 0.3 mm, it forms a beam spot having a diameter of about 15 mm on a document when simply calculated geometrically. However, to accurately sense various document sizes including A and B series and inch series, a resolution of 6 mm is essential. In light of this, the embodiment to be described uses an LED having an emission area of less than 0.1 mm inclusive. Such an emission area successfully implements a beam diameter of 15 mm although the actual beam will have a slightly larger diameter due to the aberration of a mirror and that of a lens.

Figure 4:
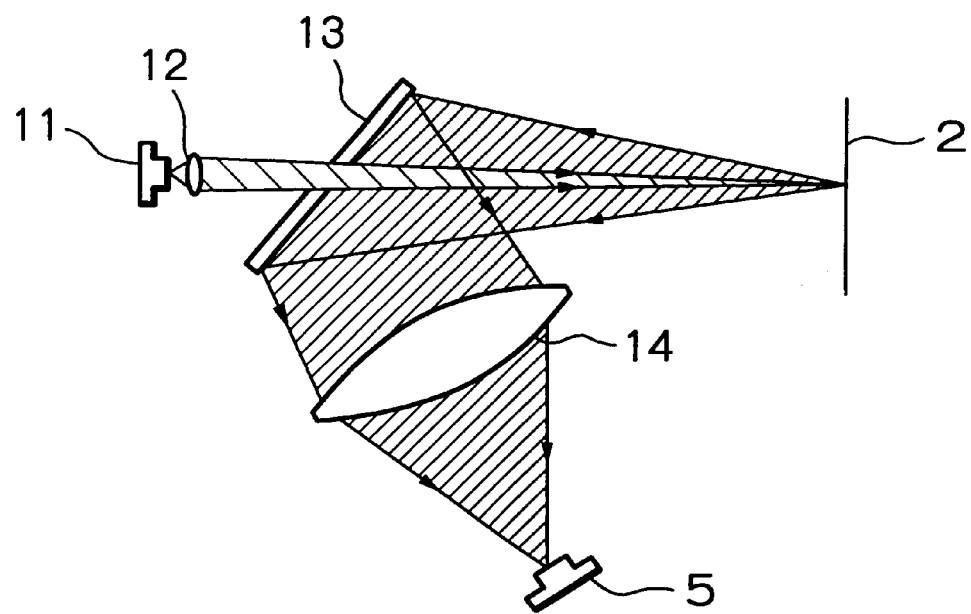
FIG. 4 shows a first embodiment of the document sensing device in accordance with the present invention.

Specifically, as shown in FIG. 4, the illustrative embodiment includes an LED 11 having the above small emission area. With this LED 11, it is possible to reduce the beam diameter on a document 2 and therefore to enhance accurate sensing. In addition, the small beam diameter allows a hole formed in the center of a mirror or optical isolator 13 for passing the beam therethrough to be reduced. It follows that a larger mirror area is available with the mirror 13 and promotes the efficient propagation of the reflection from the document 2 to a PD 5 via a condenser 14.

The illustrative embodiment is practicable with a knife edge method, as follows. The knife edge method separates a reflection from a document and causes it to reach bisected PDs via a condenser. A knife edge adjoins one of the PDs in order to diffract the light directed toward the PD. In this configuration, a relation in size between voltages output from the two PDs is inverted, depending on the diameter of a beam spot formed on the PDs. This allows a reflection from a document and a reflection from a cover plate remoter than the document to be distinguished from each other. As a result, the edges of the document and therefore the position and size of the document can be determined.

However, when use is made of the conventional LED having a large emission area, the difference between the voltages output from the two PDs is not noticeable, resulting in inaccurate sensing.

Figure 5A:
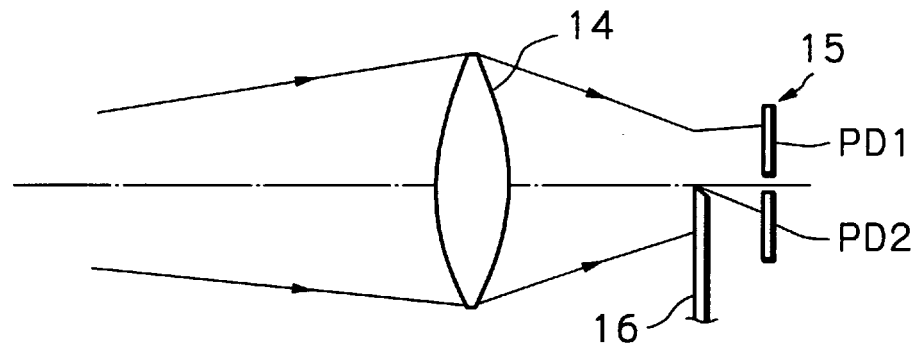
FIGS. 5A and 5B demonstrate the problem with a conventional document sensing device using a knife edge method.
Figure 5B:
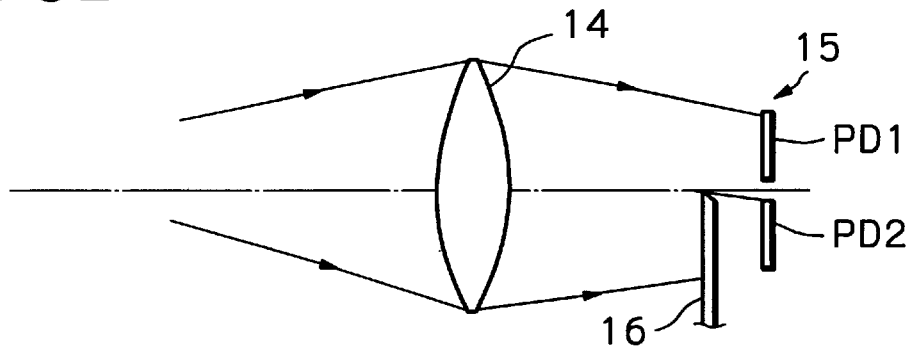
Figure 6A:
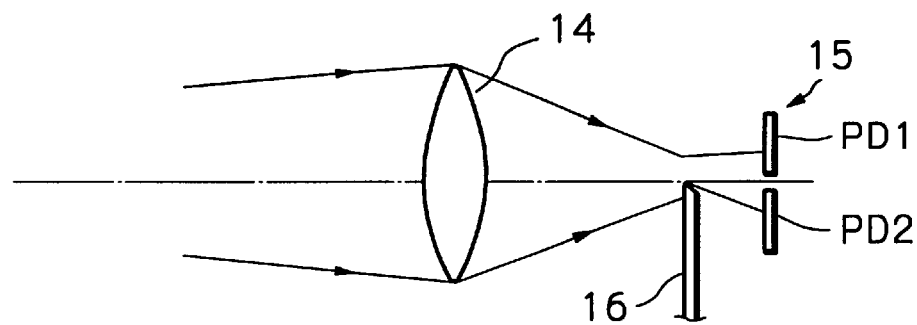
FIGS. 6A and 6B are views useful for understanding the advantage of the first embodiment in relation to the knife edge method.
Figure 6B:
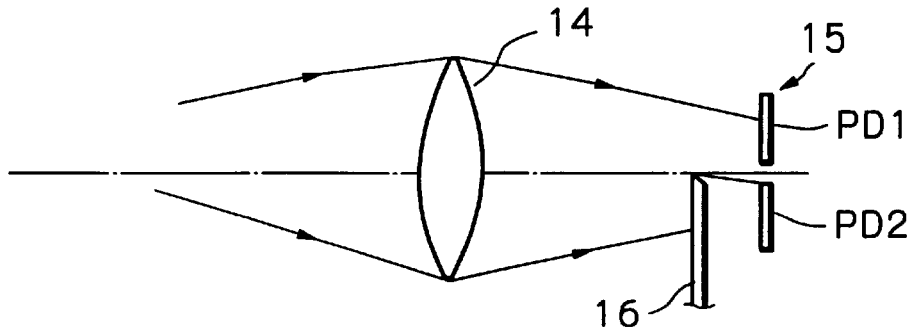

FIGS. 5A and 5B demonstrate the operation of a knife edge type document sensing device using the conventional LED having a large emission area. FIGS. 6A and 6B show how the illustrative embodiment is advantageous over the device shown in FIGS. 5A and 5B. In each of FIGS. 5A–6B, there are shown two PDs 15 (PD1 and PD2) and a knife edge 16 adjoining one of the PDs 15.

Specifically, FIG. 5A shows a condition wherein a reflection from a remote object is incident to the PD1 and PD2 while FIG. 5B shows a condition wherein a reflection from a near object is incident to the same. It will be seen that voltages output from the PD1 and PD2 differ little from the condition of FIG. 5A to the condition of FIG. 5B, lowering the sensing accuracy. By contrast, when the LED having a small emission area is used, as in the illustrative embodiment, the beam diameter formed on the PDs 15 is not blurred.

Consequently, the relation in size between the outputs of the PD1 and PD2 with respect to a reflection from a remote object (cover plate) shown in FIG. 6A and a reflection from a near object (document) shown in FIG. 6B is inverted. This clearly distinguishes such two different reflections and thereby insures accurate sensing of the position of a document.

Figure 7A:
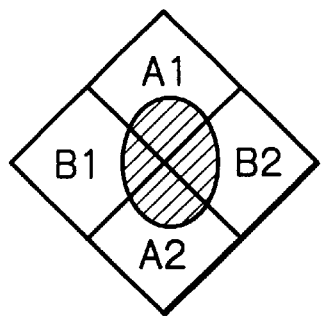
FIGS. 7A and 7B show beam spots formed on a quadrisected PD included in a conventional astigmatism type document sensing device.
Figure 7B:
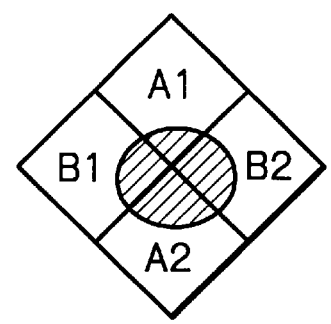
Figure 8A:
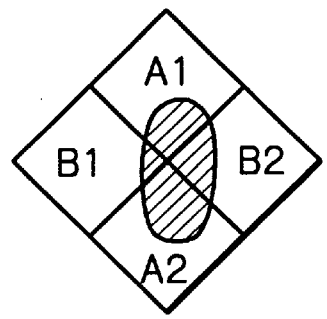
FIGS. 8A and 8B show beam spots formed on a PD identical with the PD of FIGS. 7A and 7B in accordance with the present invention.
Figure 8B:
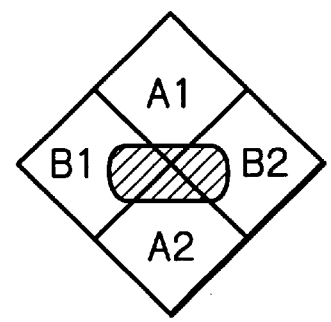

The illustrative embodiment is also practicable with the conventional astigmatism method. FIGS. 7A and 7B respectively show a beam spot formed on a quadrisected PD by use of a conventional LED and derived from a remote object and a beam spot formed on the same and derived from a near object. FIGS. 8A and 8B respectively show a beam spot formed on a quadrisected PD by the illustrative embodiment and derived from a remote object and a beam spot formed on the same and derived from a near object. The astigmatism method causes a reflection from a document to be incident to a quadrisected PD via a condenser and a cylindrical lens. The cylindrical lens provides the reflection with astigmatism with the result that the shape of a beam spot on the PD varies in accordance with the distance to the object. However, as shown in FIGS. 7A and 7B. when the LED has a large emission area, the condensed beam incident to the four regions A1, A2, B1 and B2 of the PD is blurred and increases its spot diameter. As a result, the difference in shape on the PD and representative of a difference in distance is not conspicuous, lowering the edge sensing accuracy.

In the illustrative embodiment, the LED has an area small enough to prevent the beam incident to the quadrisected PD from being blurred. Specifically, as shown in FIGS. 8A and 8B, the condensed beam forms either a vertically long spot or a horizontally long spot on the quadrisected PD in accordance with the distance to the object, so that the edges of the document can be accurately sensed.

Figure 9:
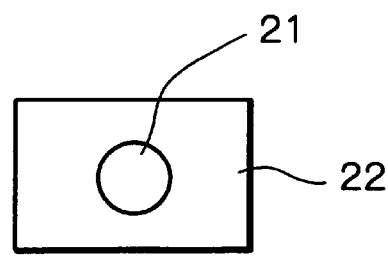
FIG. 9 shows a bisected or circle-in-rectangle type PD.

As shown in FIG. 9, the illustrative embodiment is also practicable with a beam size method using circle-in-rectangle type or bisected PDs 21 and 22 as a photoelectric transducer. Basically. as for the beam size method, the beam diameter on the circle-in-rectangle type PDs increases with an increase in the emission area of the LED. This increases the size of the PDs and therefore the overall size of the document sensing device. Moreover, the PDs with a large area causes much disturbing light to be incident thereto, resulting in a decrease in SN ratio. The illustrative embodiment solves all of the above problems due to the small emission area of the LED. That is, the embodiment reduces the size of the PDs and therefore the overall size of the sensing device while enhancing the SN ratio by reducing disturbing light.

Figure 10A:
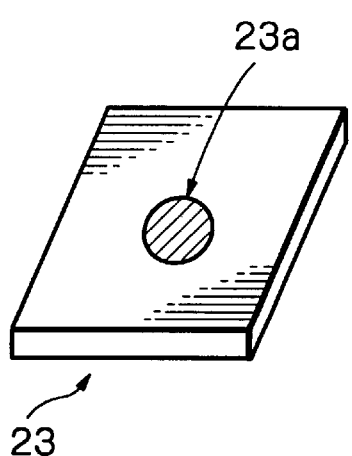
FIG. 10A shows a specific configuration of an optical isolator in accordance with the present invention.
Figure 10B:
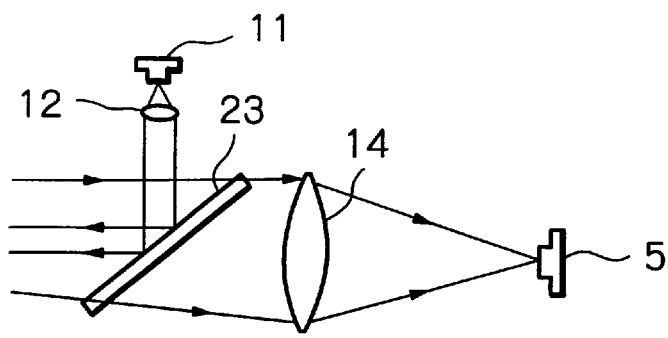
FIG. 10B shows a specific condition in which the isolator of FIG. 10A is used.

A second embodiment of the present invention will be described hereinafter with reference to FIGS. 10A, 10B, 11A and 11B. While this embodiment also uses an LED having a small emission area as a light source, an optical isolator for separating a reflection from a document should preferably be provided with the following configuration. As shown in FIG. 10A, aluminum, for example, is deposited on a part of a transparent glass sheet by evaporation in order to form a mirror portion 23a. As shown in FIG. 10B, the glass sheet with the mirror portion 23a is positioned such that light issuing from the light source 11 is reflected toward a document by the mirror portion 23a while a reflection from the document is incident to the PD 5 via the transparent portion and condenser 14.

The isolator shown in FIG. 10A noticeably increases the light transmission efficiency and therefore reduces a light loss, compared to the conventional half-mirror. This reduces the quantity of light required of the light source and thereby reduces power consumption, deterioration of the light source, and measures against heat generation. Moreover, while the isolator shown in FIG. 4 is apt to cause diffused reflection of the beam illuminating or reflected by a document at the edge of its hole, the illustrative embodiment is free from such an occurrence and further enhances accurate document sensing.

Figure 11A:
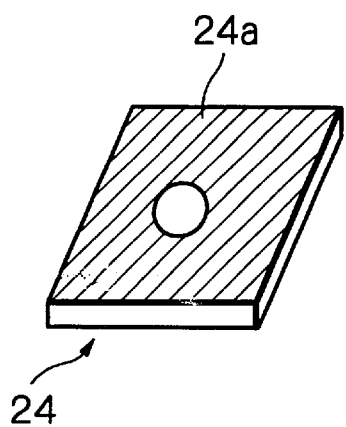
FIG. 11A shows another specific configuration of the optical isolator in accordance with the present invention.
Figure 11B:
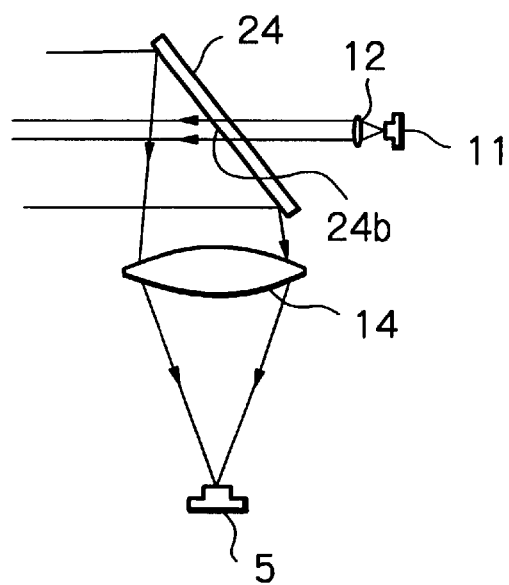
FIG. 11B shows a specific condition in which the isolator of FIG. 11A is used.

As shown in FIGS. 11A and 11B, there may be used an optical isolator 24 in which the above mirror portion and transparent portion are replaced with each other. Specifically, as shown in FIG. 11A, the isolator 24 is implemented by a transparent glass sheet whose surface 24a is covered with, e.g., aluminum except for its center portion, As shown in FIG. 11B, the isolator 24 is positioned such that a light beam from the light source 11 is transmitted through the transparent center portion toward a document while a reflection from the document is reflected by the mirror portion toward the PD 5 via the condenser 14. With this isolator 24, too, the document sensing device is capable of using light efficiently due to the small emission area of the LED.

Figure 12A:
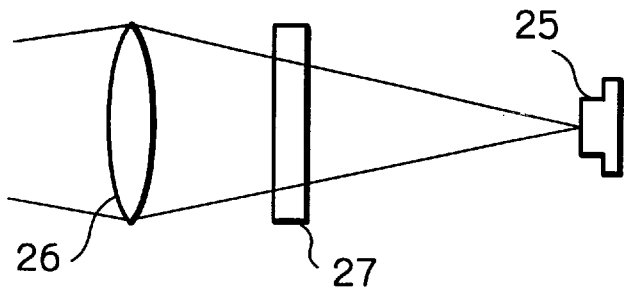
FIG. 12A shows a specific arrangement of conventional optical parts.
Figure 12B:
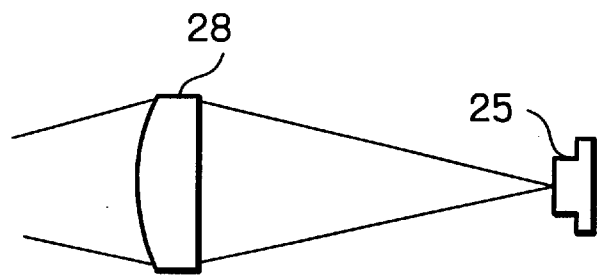
FIG. 12B shows a specific configuration of an optical part in accordance with the present invention.

FIGS. 12A and 12B show a third embodiment of the present invention. As shown in FIG. 12A, it has been customary to implement a condenser 26 and a cylindrical lens 27 as separate parts. As shown in FIG. 12B, the illustrative embodiment uses a single lens 28 in the form of a plastic molding. This successfully reduces the overall size of the document sensing device, number of assembling steps and cost as well as a light loss ascribable to reflections from constituent parts.

Figure 13A:
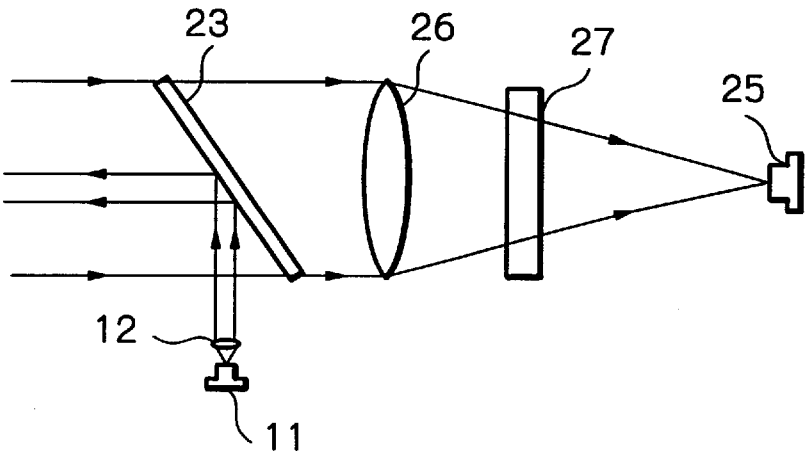
FIG. 13A shows another specific arrangement of conventional optical parts.
Figure 13B:
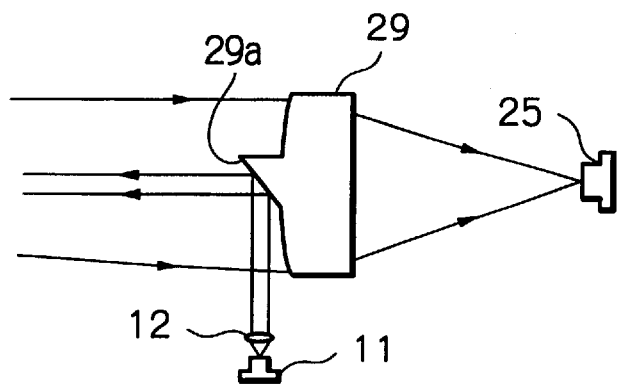
FIG. 13B shows another specific configuration of the optical part in accordance with the present invention.

FIGS. 13A and 13B show a modification of the third embodiment. As shown in FIG. 13A, it has been customary to implement the optical isolator 23, condenser 26 for condensing a reflection from a document and, if necessary, cylindrical lens 27 as separate parts. In the modification, as shown in FIG. 13B, the isolator 23, condenser 26 and, if necessary, cylindrical lens 27 are implemented as a single molded lens 29. The lens 29 includes a projection 29a which is partly covered with, e.g., aluminum for forming a mirror. The configuration shown in FIG. 13B further promotes the reduction of light loss, overall size of the device, and cost.

As stated above, the first to third embodiment achieve various unprecedented advantages, as follows.

(1) Use is made of an LED having a small emission area as a light source. Such an LED reduces the spread of a beam on an optical path and therefore the diameter of a beam spot incident to a PD. This allows the edges of a document to be accurately sensed and thereby noticeably improves the sensing accuracy.

(2) Photoelectric transducing means and document edge sensing means use the above LED in combination with one of the knife edge method, astigmatism method, and beam size method. This also reduces the spread of the beam on the optical path and therefore the diameter of the beam spot on the PD. Consequently, the characteristic particular to each of the above methods is sufficiently exhibited.

(3) Optical isolator means for separating a reflection from a document returning an illumination path is implemented by a transparent member including a mirror portion. The isolator means therefore reduces a loss on the beam path and thereby promotes the efficient use of light available with a light source.

(4) At least a condenser and a cylindrical lens are molded integrally with each other. This further reduces the light loss and in addition reduces the overall size of the device while reducing the number of parts and cost.

(5) At least the isolator, condenser and cylindrical lens are molded integrally with each other. Means for separating a reflection from a document or means for reflecting light issuing from a light source is implemented by a mirror included in a projection protruding from the above molding. This further reduces the number of parts.

(6) The LED has an emission area whose diameter is less than 0.1 mm inclusive. With such an LED, it is possible to produce a small light beam necessary for sensing documents of various sizes, and therefore to noticeably improve the sensing accuracy, compared to the conventional sensing devices.

Figure 14:
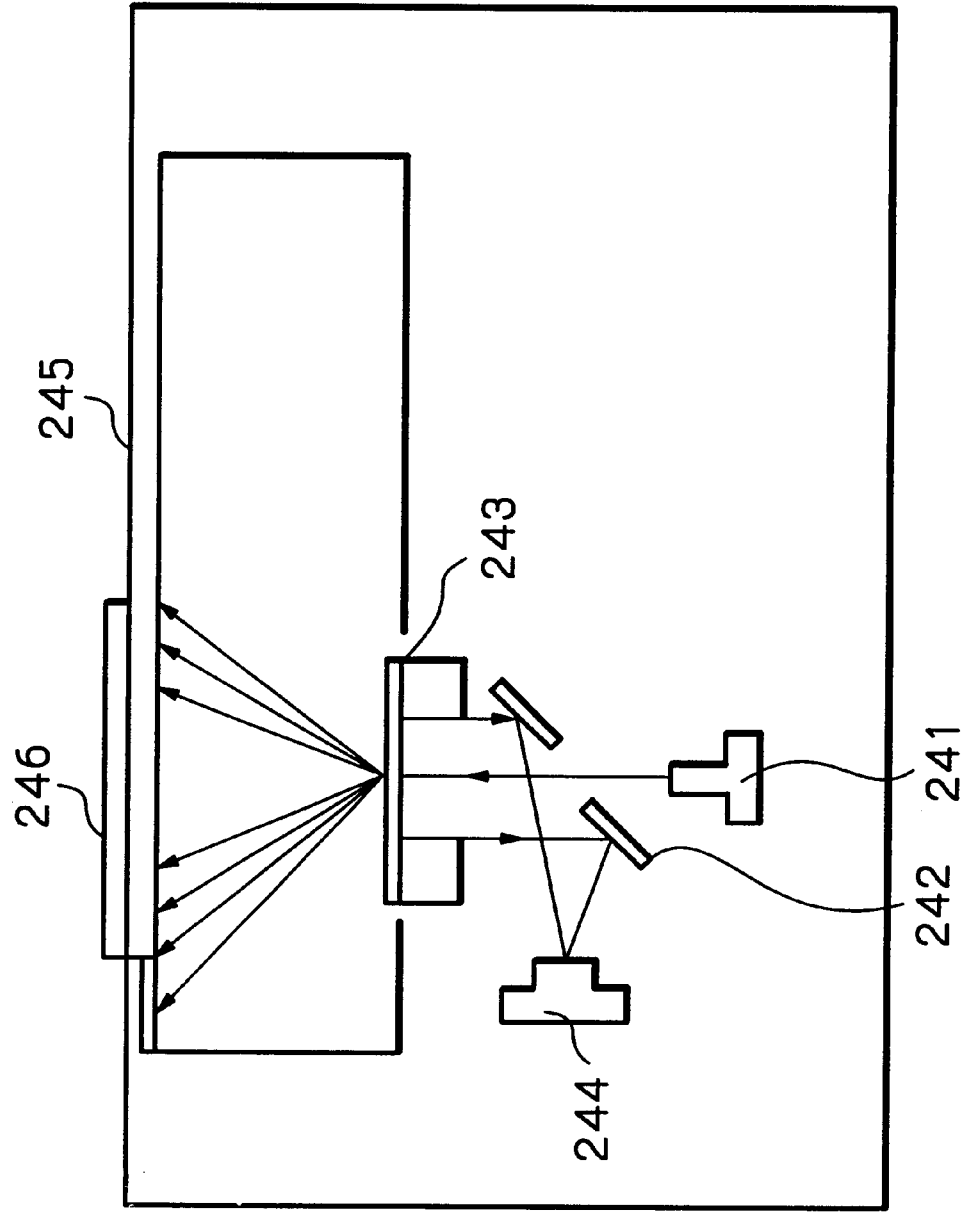
FIG. 14 shows a specific arrangement in which a conventional beam scanning type document sensing device is used in a copier.

Reference will be made to FIG. 14 for describing a conventional beam scanning type document sensing device taught in Japanese Patent Laid-Open Publication No. 6-242391 mentioned earlier. As shown, the document sensing device includes a hologram scanner or scanning means 243, a mirror 242 formed with a hole, a semiconductor laser or light source 241, and a photosensor or beam sensing means 244. In operation, a laser beam issuing from the laser 241 is incident to the hologram scanner 243 via the hole of the mirror 242. The hologram scanner 243 diffracts the incident laser beam. This, coupled with the fact that the scanner 243 is rotated by a motor, causes the diffracted laser beam to scan a glass platen 245 circularly; a document 246 is laid on the glass platen 245. The beam is transmitted through the portions of the glass platen 245 where the document 246 is absent, but is diffused by the other portions where the document 246 is present The diffused light is returned to the sensing device and sensed by the photosensor 244 via the mirror portion of the mirror 242.

The photosensor 244 outputs a signal for the portions of the glass platen 245 where the document 246 is present, but does not output it for the portions where the document 246 is absent. The sensing device is therefore capable of determining whether or not the document 246 is present on a scanning line. Further. by selecting an adequate scanning position, it is possible to obtain other various information including the size and position of the document 246.

Figure 15:
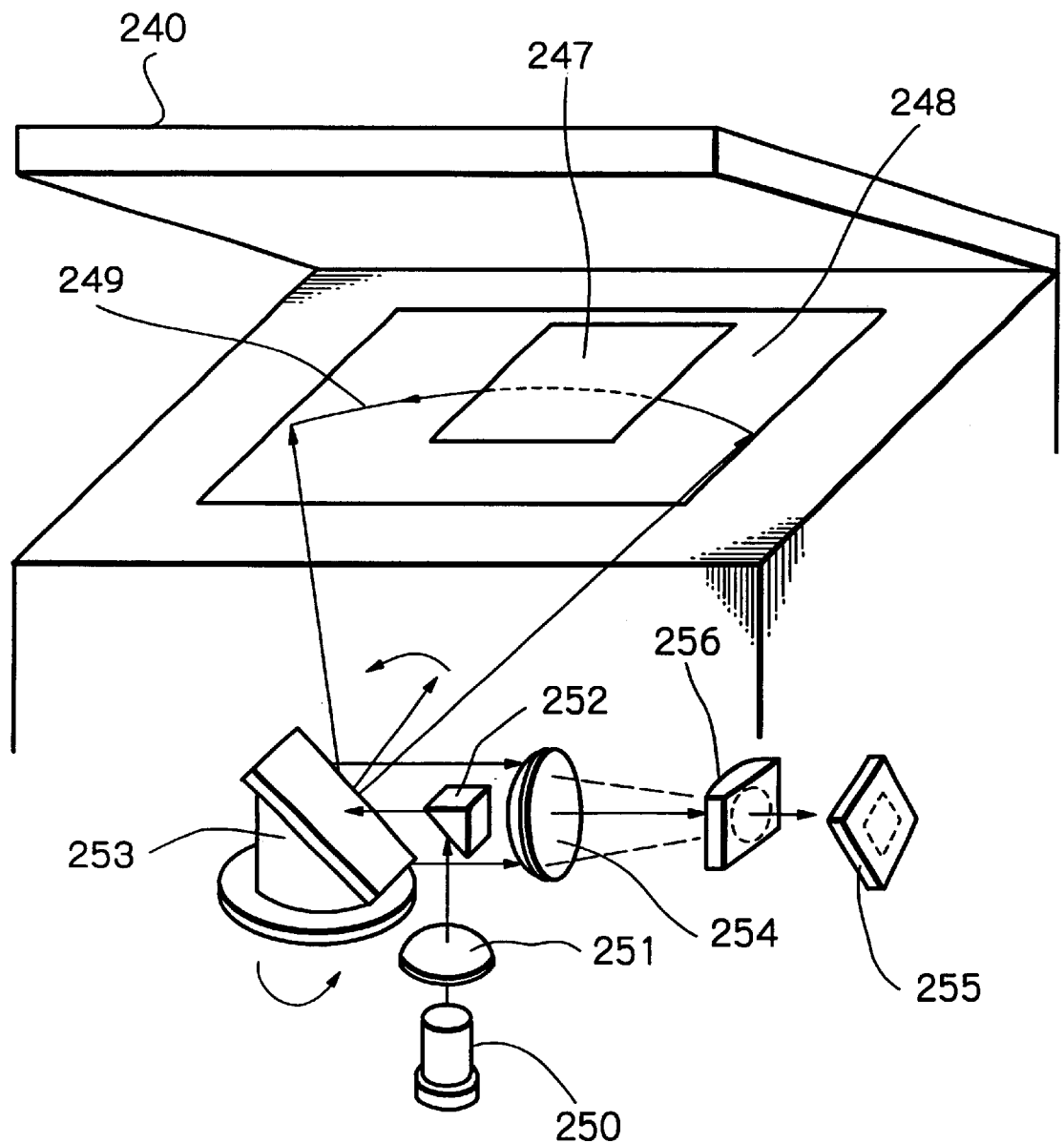
FIG. 15 shows a conventional document edge sensing device using the astigmatism method.

The problem with the document sensing device using the recurrent optics shown in FIG. 14 is that it is extremely difficult to sense a document accurately by relying on the intensity of the reflection from the document 246. This is because when a cover plate is closed, a reflection from the cover plate is also sensed. To solve this problem, the edges of a document may be sensed by distinguishing the document and cover plate on the basis of a distance from the document sensing device. FIG. 15 shows an edge sensing device using the astigmatism method which is a typical distance sensing scheme. The edge sensing device differs from the usual recurrent optics in that a cylindrical lens or a wedge is inserted in a light receiving portion for producing astigmatism, and in that a photosensor has a two row, two column light-sensitive area.

Specifically, as shown in FIG. 15, a light beam issuing from a light source 250 is incident to a half-mirror, mirror with a hole, partial reflection mirror or similar beam splitting element 252 via a lens 251. The beam splitting element 252 folds back the incident beam and directs it toward a mirror included in a beam scanning section 253. The beam reflected by the mirror scans a glass platen 248. The optical path described so far is the same as the optical path of the usual scanning optics. The beam scanning the glass platen 248 is diffused or reflected by a document 247 or a cover plate 240. The reflected Light is condensed by a less 254 and then incident to a photosensor 255 via a cylindrical lens 256. The cylindrical lens 256 or a wedge preceding the light-sensitive device of the photosensor 255 causes the shape of the beam to change in accordance with the distance of reflection. This is based on the orientation of the cylindrical lens 256 or that of the wedge. Assume that the cylindrical lens 256 is so oriented as to condense the incident light in the horizontal direction of a PD.

Figure 16A:
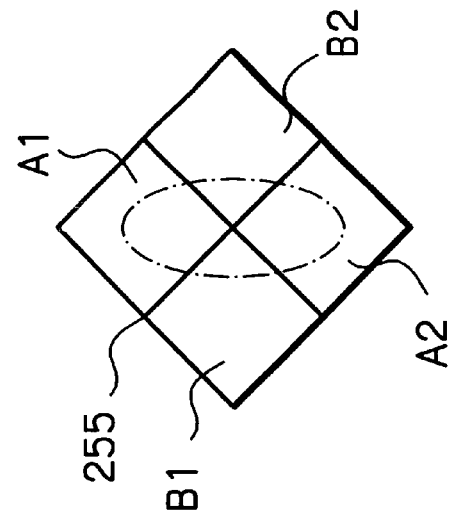
FIGS. 16A–16C shows a specific condition in which a distance is measured by the conventional astigmatism method using a 2×2 light-sensitive surface.

In the above configuration, the focal distance in the horizontal direction on the PD is smaller than the focal distance in the vertical direction. As a result, for the same object position, two focuses occur in the horizontal and vertical directions at the image side. In this specific case, the focus in the vertical direction is closer to the lens than the focus in the horizontal direction. At the image side, two focuses also occur at the object side. Therefore, when the PD is fixed at the image sides and if the optical path is long, the beam is condensed in the vertical direction and blurred in the horizontal direction Consequently, as shown in FIG. 16A, the beam forms a horizontally long spot. If the optical path is short, the beam forms a vertically long spot, as shown in FIG. 16C. At medium distances, the horizontally long spot smoothly changes to the vertically oblong spot by way of a circular spot shown in FIG. 16B.

Figure 16B:
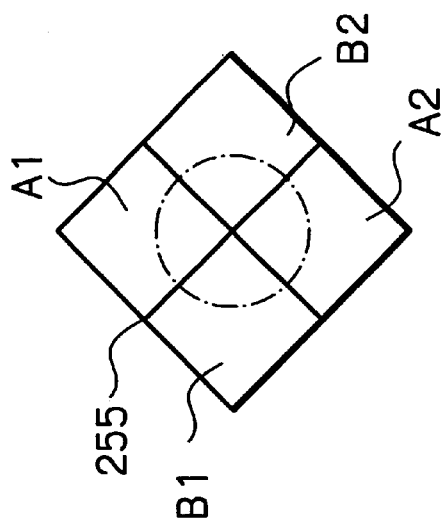
Figure 16C:
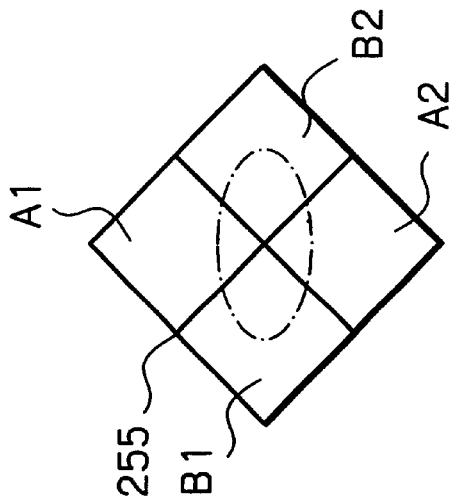
Figures 17A, 17B:
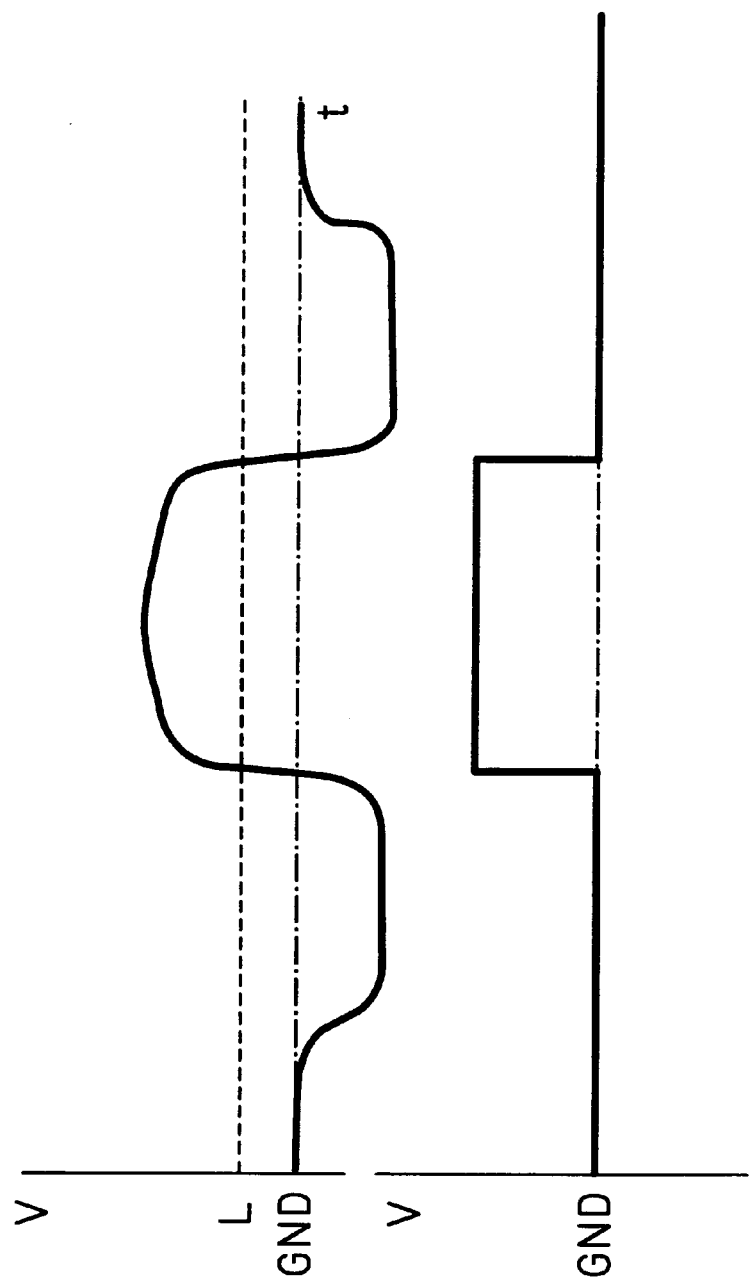
FIG. 17A shows a specific signal derived from beam scanning shown in FIGS. 15 and 16A–16C.
FIG. 17B shows a waveform representative of a document and appearing when the signal of FIG. 17A is binarized by use of a preselected threshold.

The astigmatism method uses the 2×2 light-sensitive surface shown in FIGS. 16A–16C and determines a distance by the calculation of (A1+A2)–(B1+B2). For example, when the optics is so adjusted as to form the circular beam spot of FIG. 16B at a distance between the cover plate 240 and the document 247, FIG. 15, a signal shown in FIG. 17A appears as a result of the above calculation,. When the signal of FIG. 17A is binarized by use of a preselected threshold level L, only a signal representative of the document can be separated, as shown in FIG. 17B. By measuring the width of this signal, the angle at which the edge is output, and a period of time from a reference position, it is possible to determine the position and size of the document.

Figure 18:
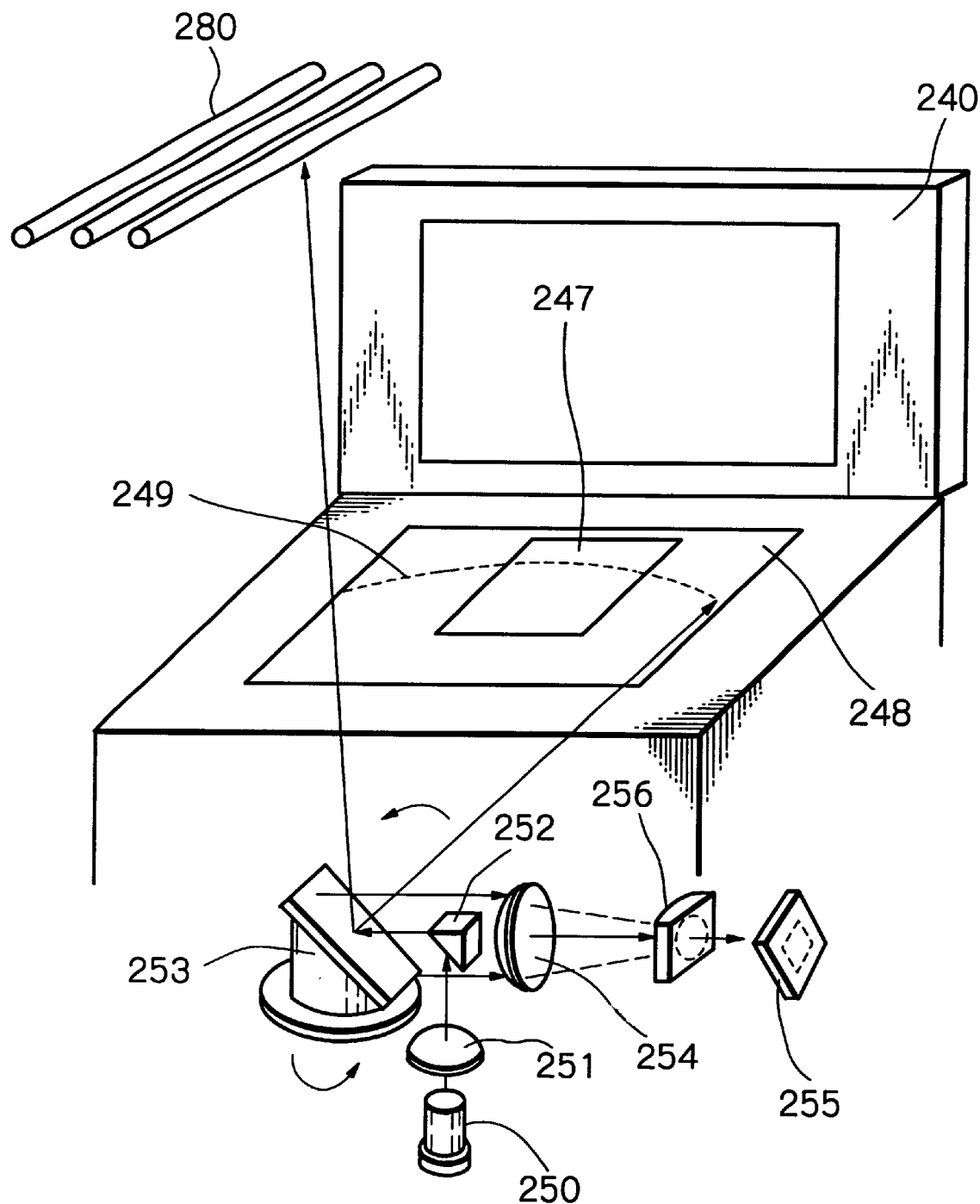
FIG. 18 shows a specific condition in which a copier, for example, including the document edge sensing device is used in an illuminated room.
Figure 19:
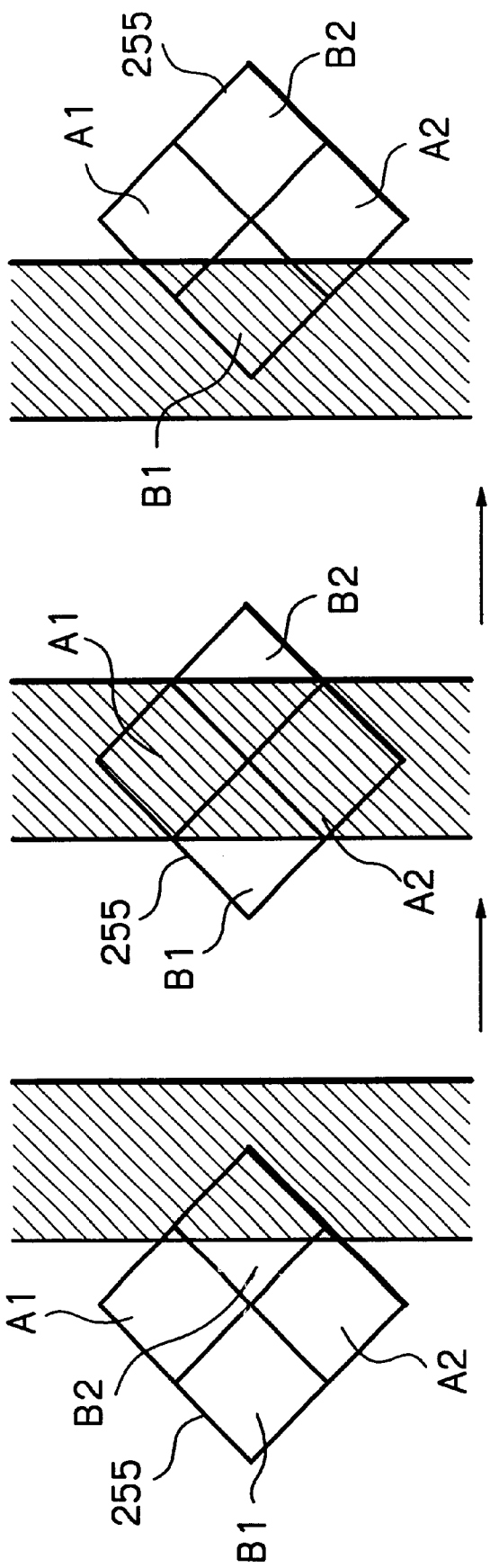
FIG. 19 shows a specific condition in which the image of disturbing light moves across the light-sensitive surface of a photosensor.
Figures 20A, 20B:
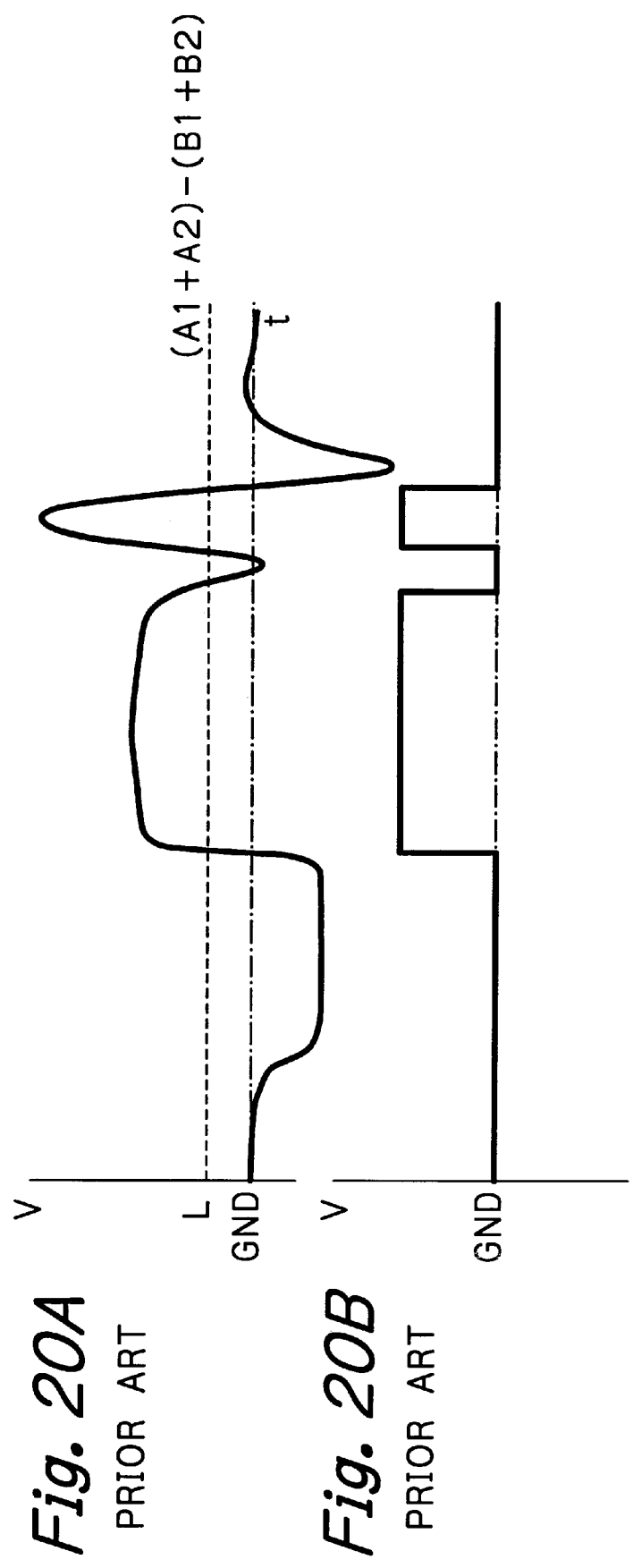
FIG. 20A shows a waveform representative of the result of calculation of (A1+A2)−(B1+B2) executed in the condition shown in FIG. 19.
FIG. 20B shows a waveform produced by binarizing the signal of FIG. 20A by use of a preselected threshold.

A copier, for example, loaded with the conventional edge sensing device is usually operated in a room illuminated by, e,g,, fluorescent lamps, Further, as shown in FIG. 18, fluorescent lamps or similar illuminators 280 are often positioned above a scanning line 249 because the operator can copy the document 247 even by pressing a copy start button while pressing down the document. In the specific case shown in FIG. 18, the image of the lamps 280 is noticeably blurred because the lamps 280 are remote from the focuses. However, as shown in FIG. 19, the image of the lamps 280 extends across the PD surface as a large light image. If (A1+A2)–(B1+B2) is executed in the above condition, then a signal representative of a document appears even when a document is absent, as shown in FIG. 20.

A fourth embodiment of the present invention which is a solution to the above problem will be described hereinafter. This embodiment is applicable to a copier, facsimile apparatus, scanner or similar apparatus of the type including a glass platen and reading a document laid on the glass platen. In this type of apparatus, when the size of the document or the deviation of the document from a reference position and its inclination are known beforehand, the apparatus can execute correction and read the document accurately even if the document is not correctly positioned. For this purpose, a device for outputting information representative of the size and position of a document is essential. The illustrative embodiment implements such a device.

Figure 21:
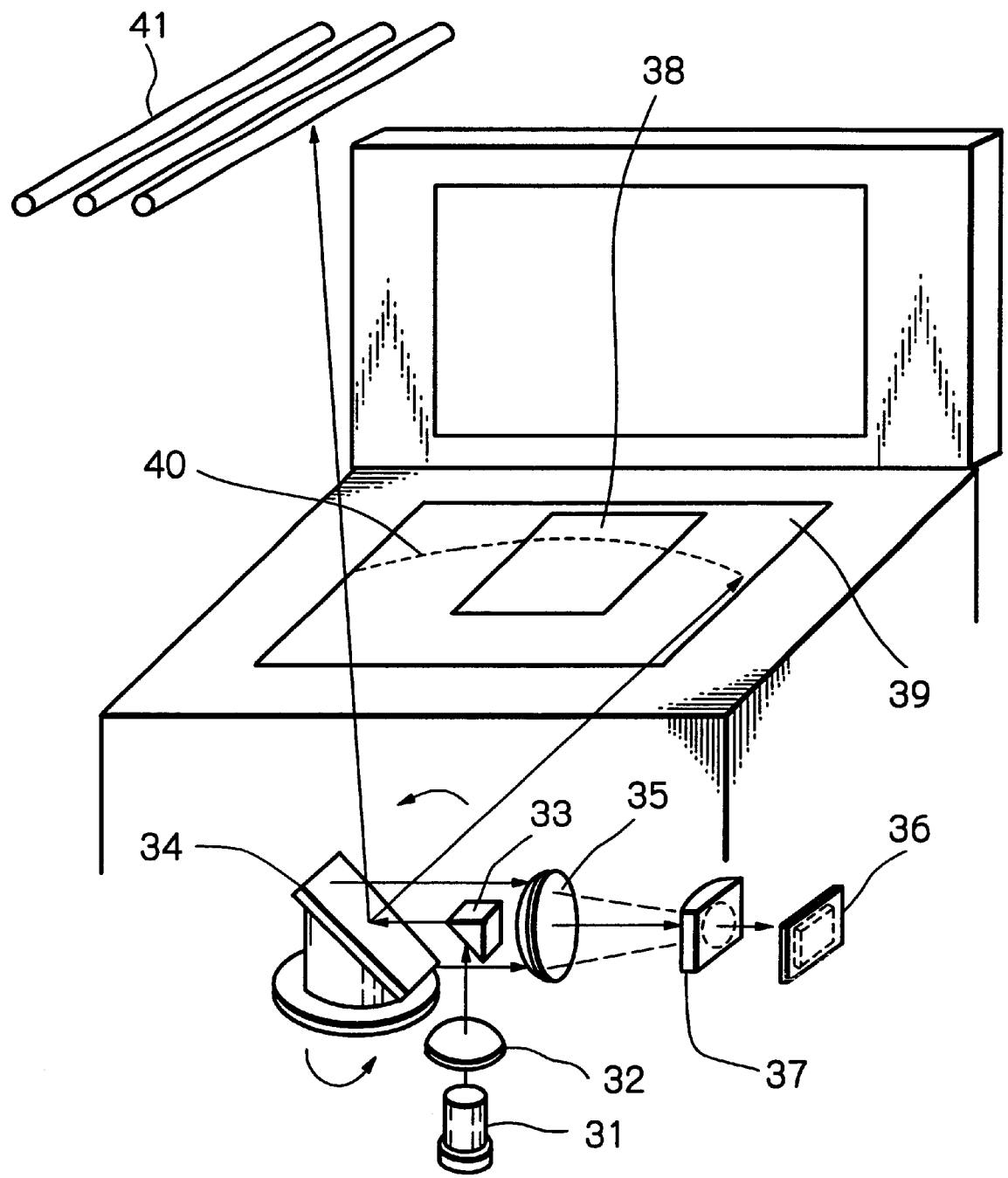
FIG. 21 shows a fourth embodiment of the present invention.

As shown in FIG. 21, the illustrative embodiment includes a light source 31 for emitting light. A lens 32 condenses or collimates the light, A partial reflection mirror 33 plays the role of means for separating an optical path at the light emitting side and an optical path at the light receiving side. A scanning section 34 deflects the beam output from the lens 32 and causes it to scan a glass platen 39. While the beam scans the glass platen 39, Light diffused by a document 38 is incident to a lens, a photosensor 36 and a cylindrical lens 37. There are also shown in FIG. 21 the locus of beam scanning 40 and illuminators 41.

For the light source 31, use may be made of an LD (Laser Diode), an electric bulb or an LED by way of example. Because the illustrative embodiment is applied to a PPC (Plain Paper Copier) or similar apparatus operated by hand, an LED is desirable from the standpoint of safety operation, condensing efficiently, power saving, and so forth, The lens 32 should preferably be designed to allow the light from the light source 31 to efficiently illuminate the document laid on the glass platen 39, and to reduce the diameter of a beam spot on the glass platen 39 as far as possible.

If the light source 31 is implemented by an LD or similar light source having a small emission area, then the lens 32 may be implemented by a collimator lens. However, when the light source 31 is implemented by an LED or similar light source having a large emission area, it is preferable to use a condenser for focusing the incident light on the glass platen 39. The partial reflection mirror or beam splitting means 33 may be implemented by a half-mirror or similar beam splitter or a partial transmission mirror.

Figure 22:
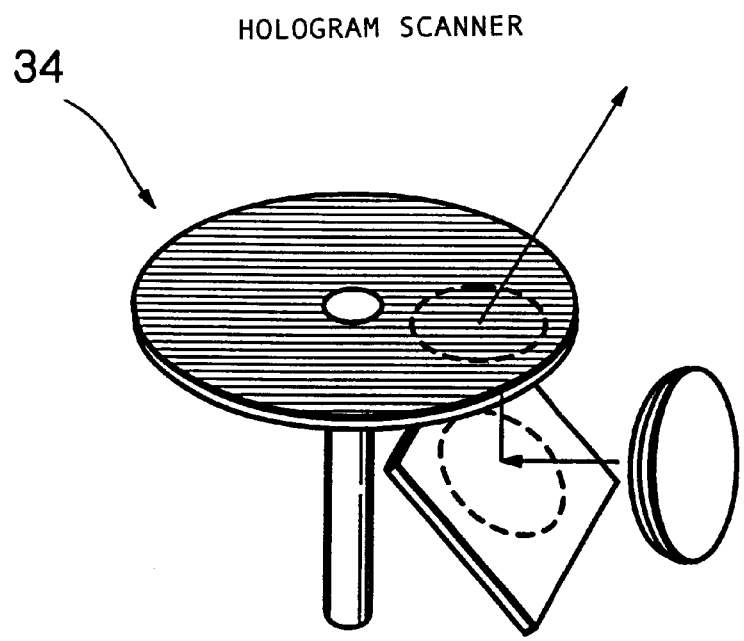
FIG. 22 shows a specific configuration of a hologram scanner.
Figure 23:
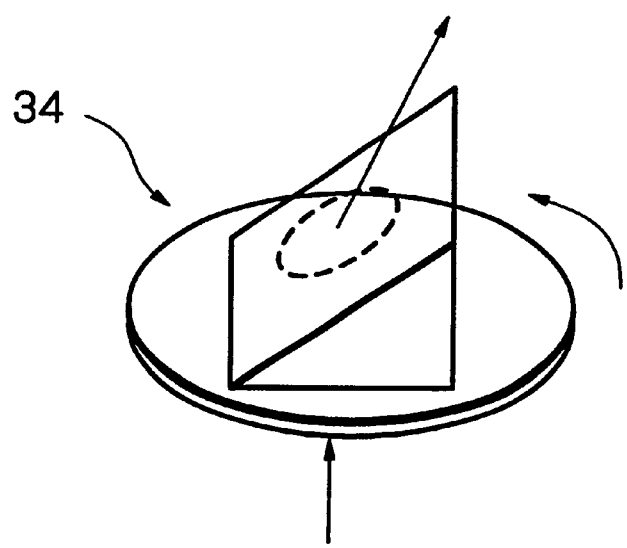
FIG. 23 shows a specific configuration of a prism scanner.

For the scanning section 34, use may be made of a hologram scanner shown in FIG. 22, a prism scanner shown in FIG. 23 or similar rotatable deflecting device. The configuration of the scanning section 34 depends on the desired performance. For example, when the locus of beam scanning 40 should be circular. the prism scanner or the hologram scanner is desirable. While the prism scanner is advantageous over the hologram scanner as to the efficient use of light. the latter is advantageous over the former when a large deflection angle is desired. A mirror scanner provides a large deflection angle and easy to use although it cannot implement a circular locus. The photosensor 36 may advantageously be implemented by a PD whose light-sensitive surface is divided into four in the vertical and horizontal directions.

This embodiment is characterized in that the lines dividing the light-sensitive surface of the photosensor 36 extend perpendicularly or in parallel to the direction of movement of an image derived from the scanning of the scanning section 34.

The operation of the illustrative embodiment will be described hereinafter hereinafter, taking a mirror scanner as an example. The light issuing from the light source 31 illuminates the glass platen 39 which is formed of glass transparent for light. The light is transmitted through the glass platen 39 if the document 38 is absent or diffused by the document 38 if it is present. The diffused light is condensed by the lens 35 and then incident to the photosensor 36.

Figure 24:
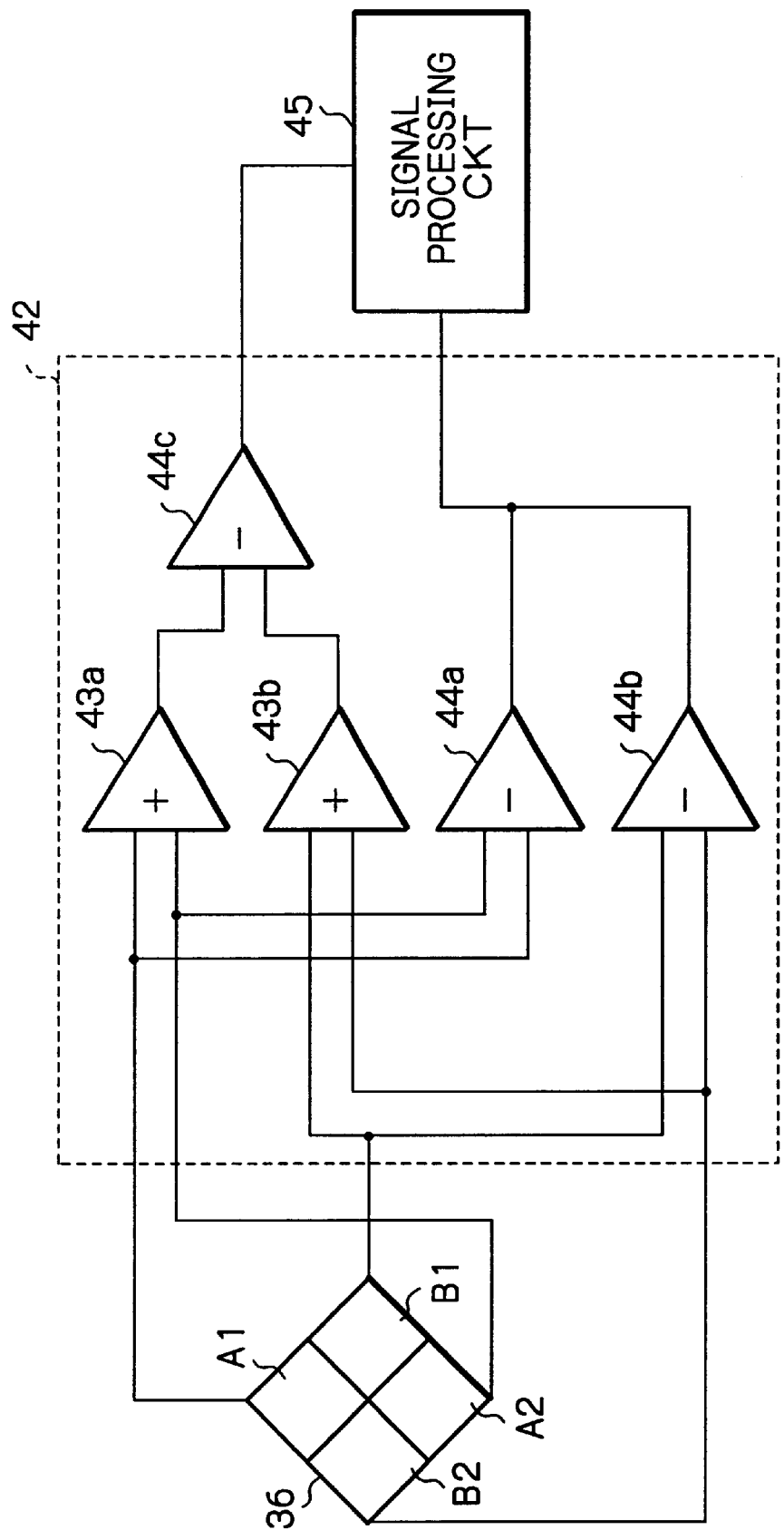
FIG. 24 is a block diagram schematically showing circuitry for performing calculation with the outputs of a photosensor shown in FIG. 21.

As shown in FIG. 24, assume that the photosensor 36 has a 2×2 light-sensitive surface, i.e., quadrisected light-sensitive regions A1, A2, B1 and B2. Circuitry for processing signals derived from the four regions A1—B2 is also shown in FIG. 24. As shown, calculating means 42 has adders 43a and 43b and subtracters 44a and 44b. The adders 43a and 43b and subtracters 44a and 44b transform signals output from the photosensor 36 to four signals (A1+A2), (B1+B2), (A1−A2) and (B1−B2). As for the adders 43a and 43b and subtracters 44a and 44b, use may be made of any desired amplifying method and calculating method so long as they are capable of outputting desired signals. Also, the regions A1 and A2 and the regions B1 and B2 each should only be symmetrical with respect to the point where the two division lines intersect each other.

The signals (A1+A2) and (B1+B2) are input to a subtracter 44c and transformed to a signal (A1+A2)−(B1+B2) thereby. The conventional astigmatism method determines the length of an optical path on the basis of the above signal (A1+A2)−(B1+B2). The illustrative embodiment additionally produces the difference signals (A1−A2) and (B1−B2) and causes a signal processing circuit 45, FIG. 24, to execute a procedure to be described with reference to FIGS. 26A–26D and 27A–27C.

Figure 25:
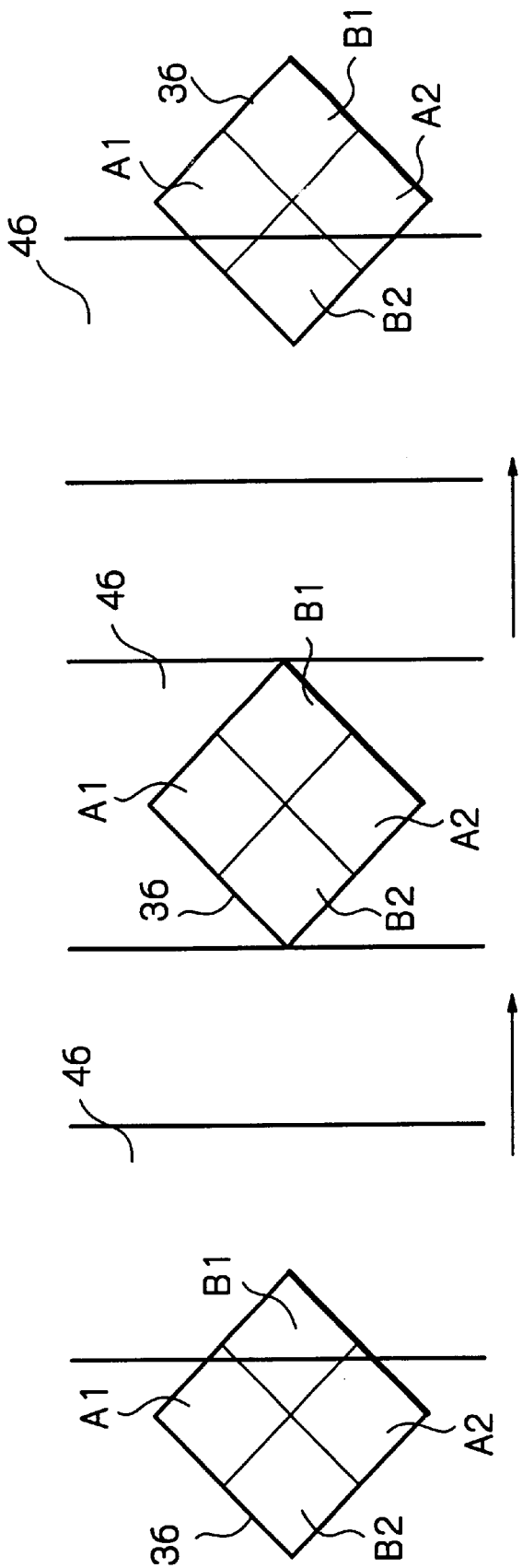
FIG. 25 shows a specific condition in which the image of disturbing light moves across the Light-sensitive surface of a photosensor.

The advantage achievable with the difference signals (A1−A2) and (B1−B2) is as follows. As shown in FIG. 25, assume that the image 46 of disturbing light moves across the photosensor 36, and that the document sensing operation is not executed when a binarizer, not shown, included in the signal processing circuit 45 detects the difference signals.

Figure 26A:
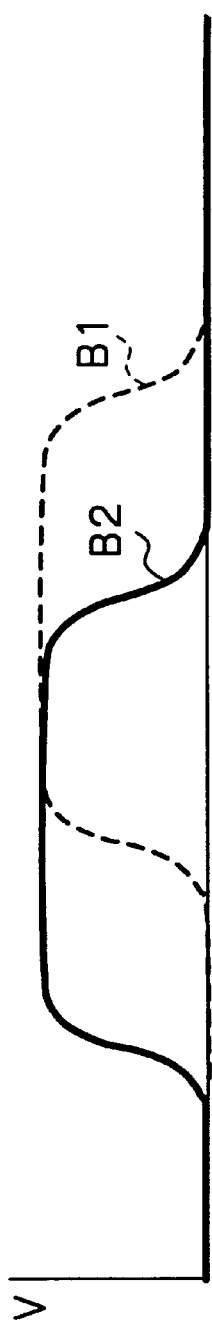
FIGS. 26A–26D show waveforms representative of signals appearing in the circuitry of FIG. 24 in the condition of FIG. 25.
Figure 26B:
Figure 26C:
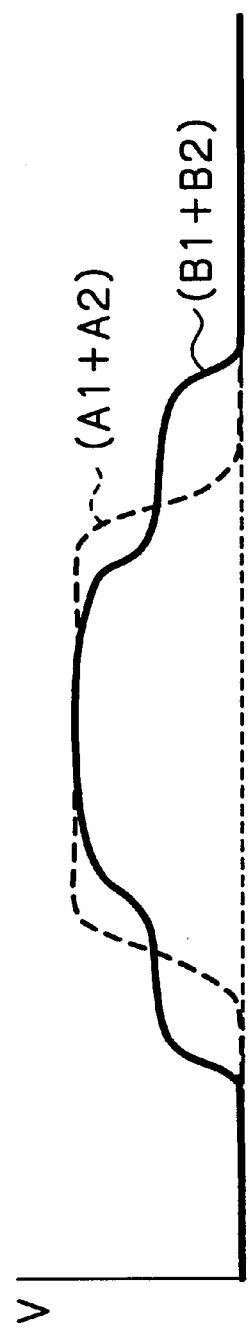
Figure 26D:
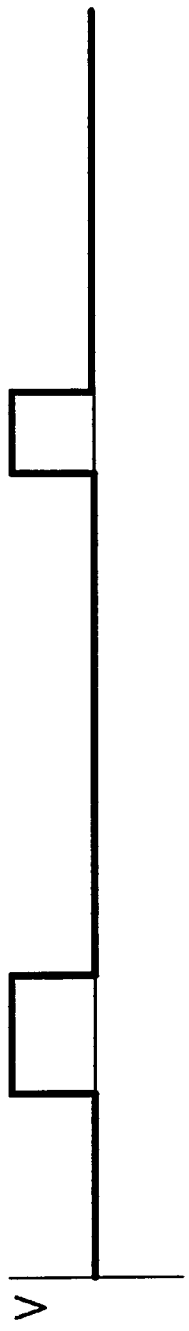

When the image 46 moves across the photosensor 36, as shown in FIG. 25, signals derived from the regions B1 and B2 sequentially vary, as shown in FIG. 26A. When the portions where the difference signals appear are generated as non-detection signals, a signal shown in FIG. 26B is output. The sum signals (A1+A2) and (B1+B2) vary in the manner shown in FIG. 26C. Therefore, when the signal (A1+A2)−(B1+B2) is binarized by use of the ground level as a threshold, there is produced a signal shown in FIG. 26D. Because the signal shown in FIG. 26D is the non-detection signal, the signal derived from the disturbing light is masked and not sensed if the portions of the detection signal corresponding to the non-detection signal portions are neglected.

Figures 27A, 27B, 27C:
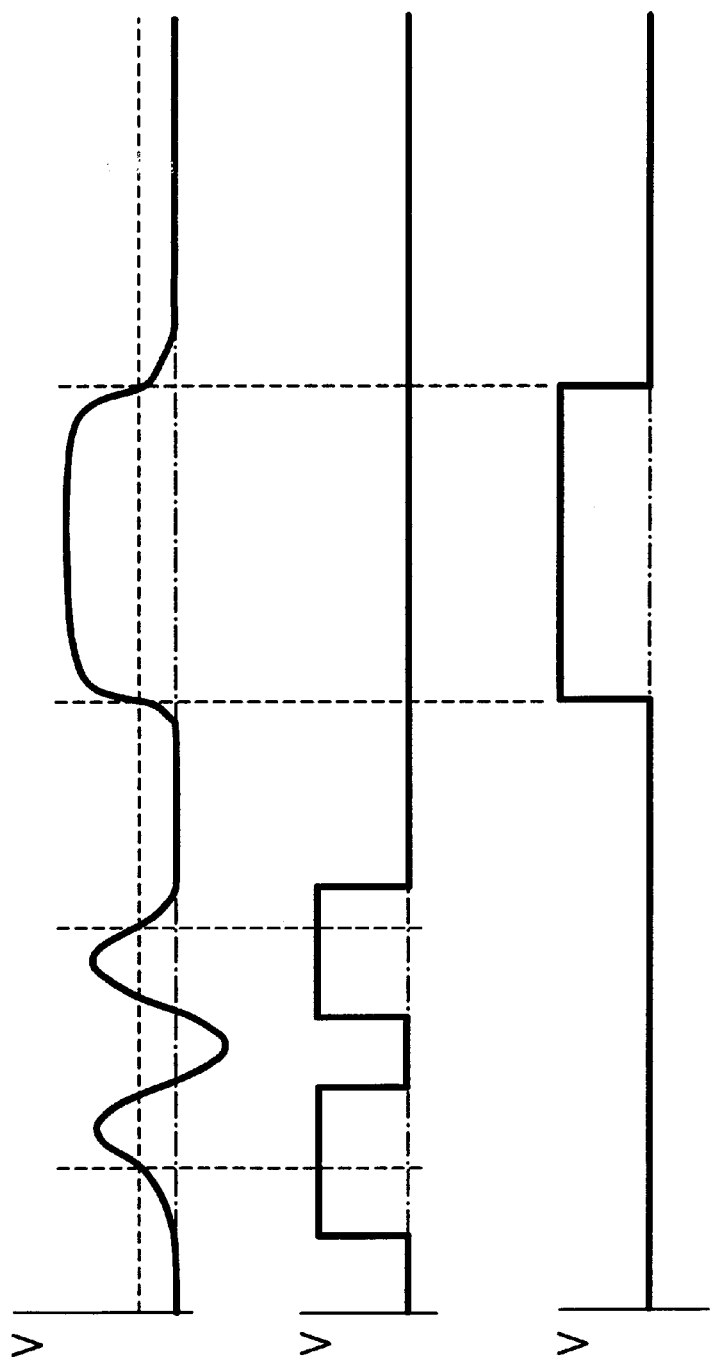
FIGS. 27A–27C shows waveforms representative of signals appearing in the circuitry of FIG. 24 when a reflection from a document moves across the light-sensitive surface of the photosensor.

As shown in FIG. 27A, in the case of a reflection from a document, no difference signals are output. Therefore, as shown in FIG. 27C, a signal representative of the document and free from noise is output.

Reference will be made to FIGS. 28 and 29A–29D for describing a fifth embodiment of the present invention. This embodiment pertains to the calculating circuit and includes absolute value circuits respectively assigned to the difference signals derived from two symmetrical light-sensitive regions.

Figure 28:
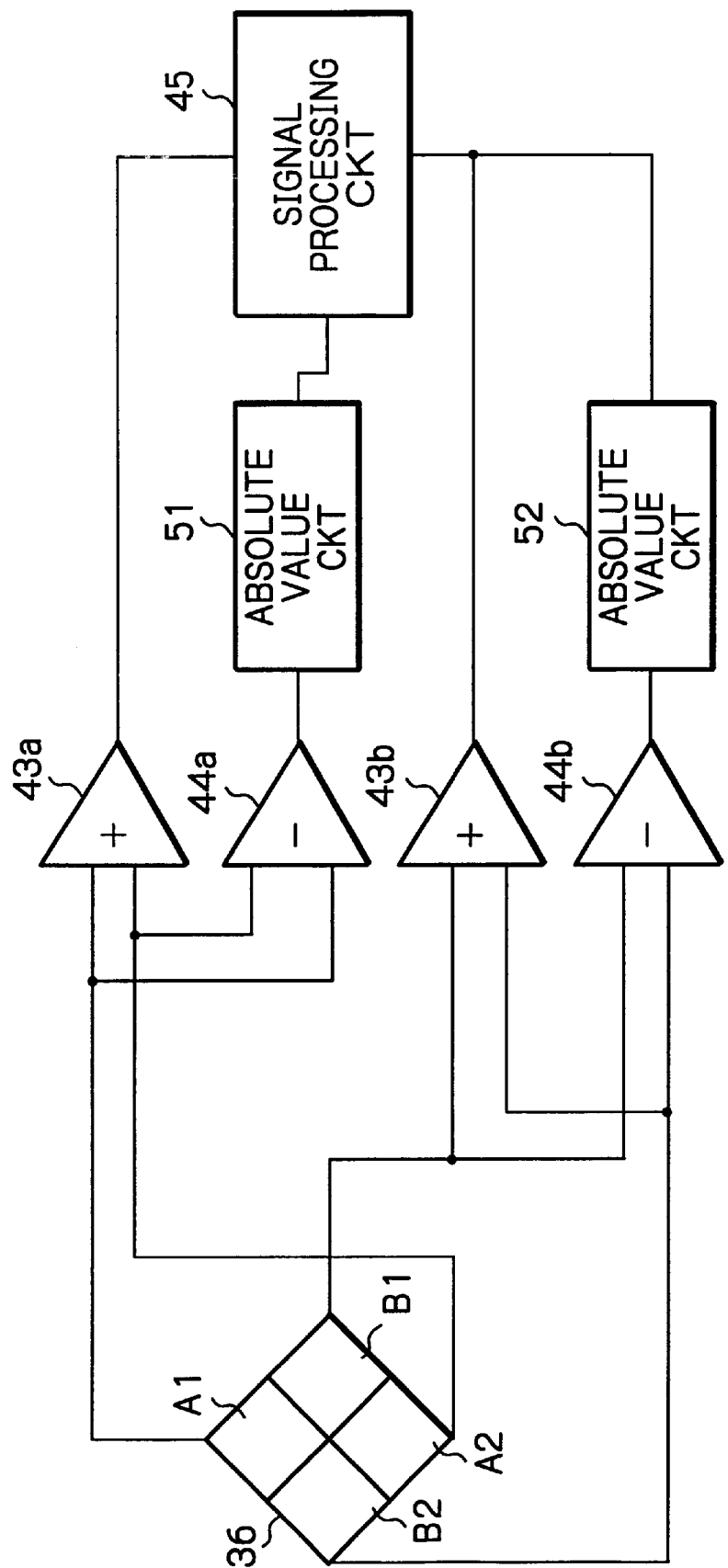
FIG. 28 is a block diagram schematically showing another specific circuitry for processing the outputs of the photosensor.

Specifically, this embodiment is identical with the fourth embodiment up to the step of producing the sum signals (A1+A2) and (B1+B2) and difference signals (A1−A2) and (B1−B2). As shown in FIG. 28, absolute value circuits 51 and 52 respectively produce the absolute values of the difference signals (A1−A2) and (B1−B2) The absolute values respectively output from the absolute value circuits 51 and 52 and the sum signals (A1+A2) and (B1+B2) respectively output from the adders 43a and 43b are subjected to subtraction. As illustrated schematically in the drawings, the results of subtraction are fed to the signal processing circuit 45 for sensing the document.

How the fifth embodiment excludes the disturbing light will be described, again taking the image 46 shown in FIG. 25 as an example. The sum signals (A1+A2) and (B1+B2) output from the adders 43a and 43b, respectively, vary in the manner shown in FIG. 29A. The difference signal (A1+A2)−(B1+B2), i.e., a distance signal appears, as shown in FIG. 29B. A difference signal between the signals A1 and A2 does not appear because the direction in which the regions A1 and A2 face is perpendicular to the direction of movement of the image 46. On the other hand, as for the signals Bi and B2, a difference signal shown in FIG. 29C is output and transformed to a signal indicated by a dashed line in FIG. 29C by the absolute value circuit 52. FIG. 29D shows a signal representative of a difference between the sum signals and the absolute value signal of the difference signal, the signal appears at the negative side. As also shown in FIG. 29D, when a positive threshold level L is selected, there can be output a detection signal free from false components ascribable to the disturbing light.

As stated above, by combining the absolute value signals of the difference signals and astigmatism signal, it is possible to execute continuous document sensing free from interruption.

Figure 30:
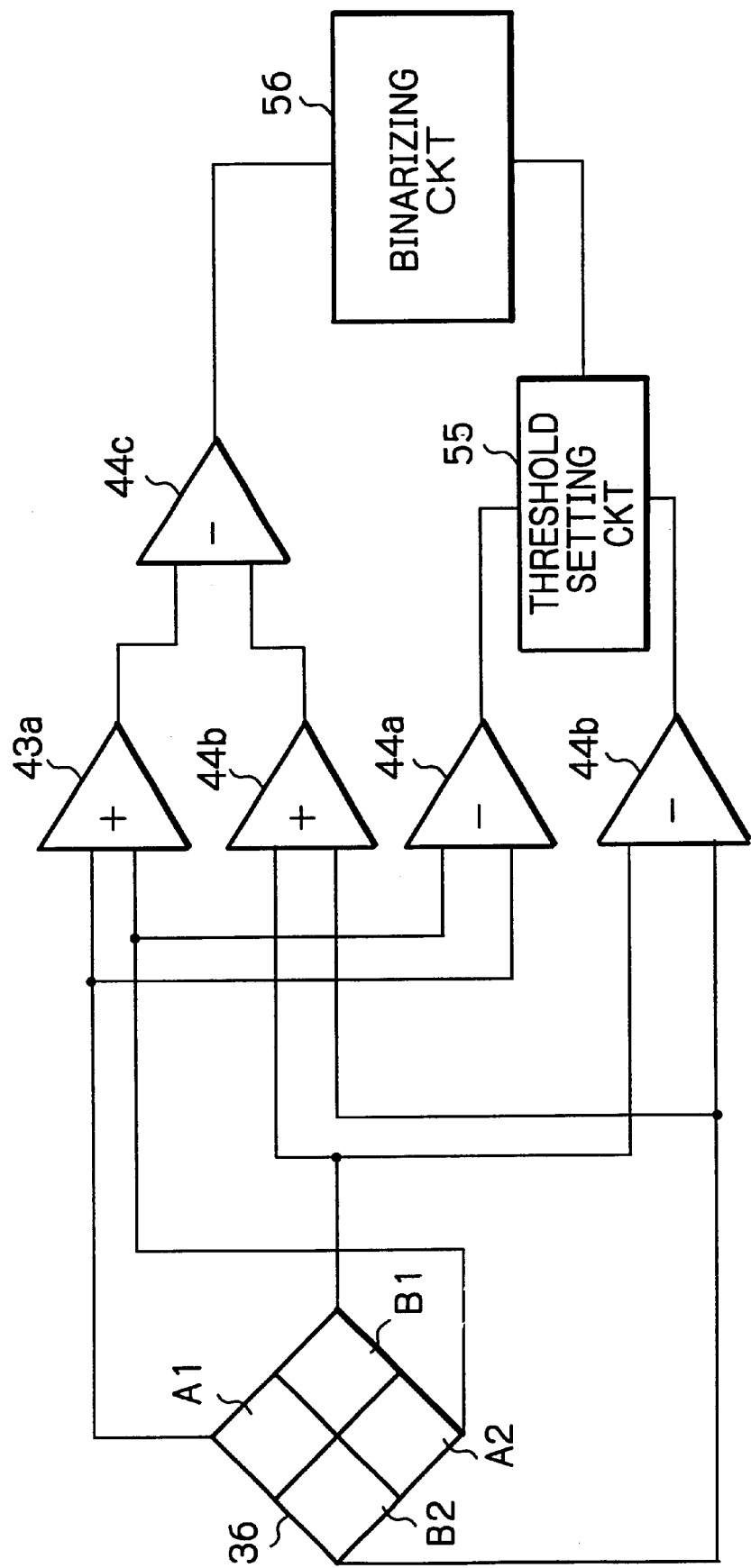
FIG. 30 is a block diagram schematically showing another specific circuitry for processing the outputs of the photosensor.

A sixth embodiment of the present invention will be described with reference to FIGS. 30 and 31A–31D. This embodiment also pertains to the calculating circuit. Characteristic features of this embodiment are a section for producing an optical path examining signal based on the difference between the sum signals of the symmetrical light-sensitive regions, as in the conventional astigmatism method, and a threshold setting circuit for setting a threshold for the binarization of the astigmatism signal by using the difference between two symmetrical light-sensitive regions. In FIG. 30. the reference numerals 55 and 56 designate a threshold setting circuit and a binarizing circuit, respectively.

The operation of the illustrative embodiment will be described hereinafter, again taking the image 46 shown in FIG. 25 as an example. Because a difference signal between the signals A1 and A2 does not appear in the condition shown in FIG. 25, let the following description concentrate on the signals 31 and B2. In the condition shown in FIG. 25, the difference signal (B1−B2) varies, as shown in FIG. 31A. The sum signals (A1+A2) and (B1+B2) appear, as shown in FIG. 31B. As a result, the astigmatism signal (A1+A2)−(B1+32) varies in the manner indicated by a solid line in FIG. 31C. When the sum signal of |B1−B2| and DC component is used as a threshold signal, the threshold signal varies in the manner indicated by a dashed line in FIG. 31C. This successfully obviates erroneous detection ascribable to a noise component derived from the disturbing light.

As stated above, by using the difference signal to set a threshold, it is possible to execute stable document sensing free from errors ascribable to disturbing light.

Figure 32:
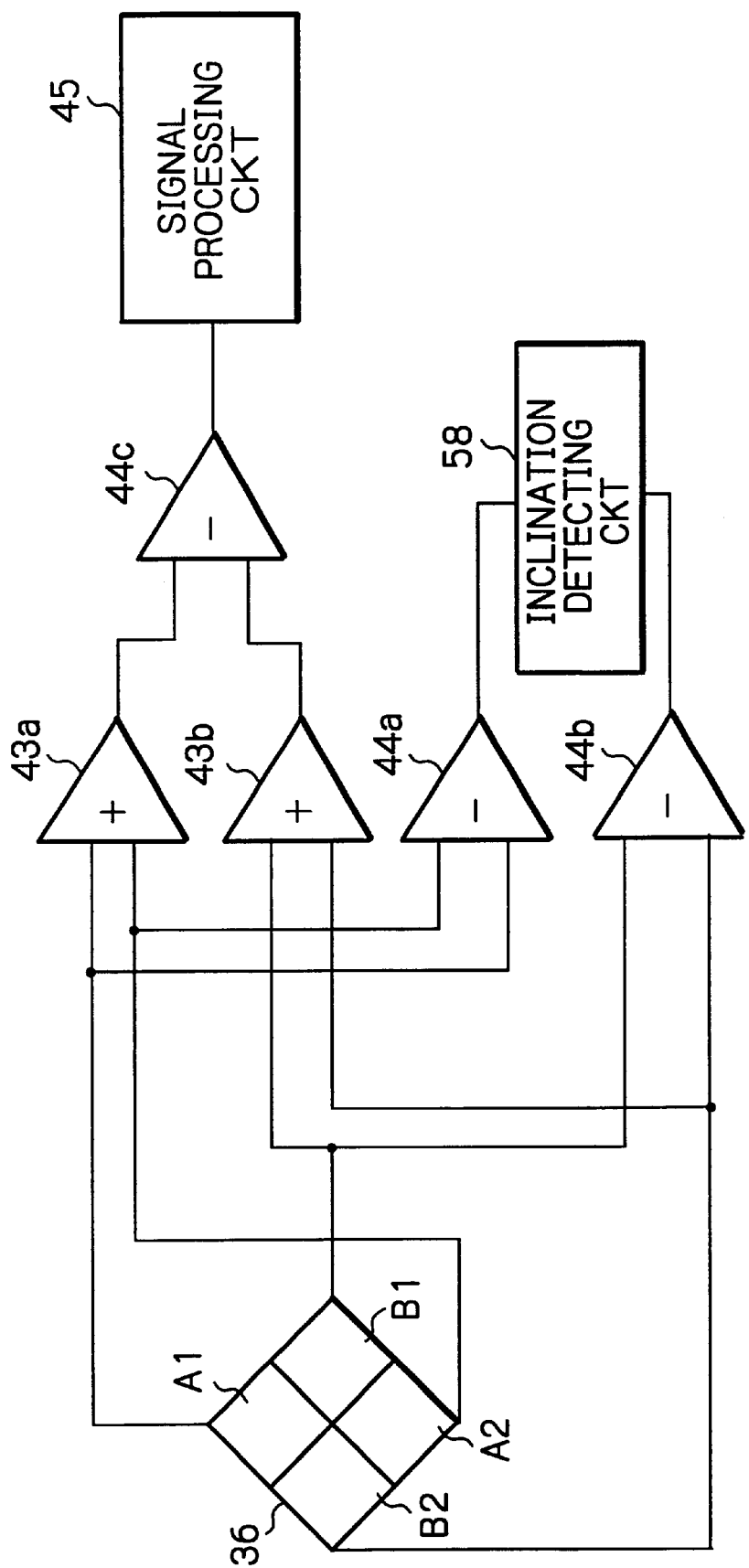
FIG. 32 is a block diagram schematically showing another specific circuitry for processing the outputs of the photosensor.

A seventh embodiment of the present invention will be described with reference to FIGS. 32–37. This embodiment also pertains to the calculating circuit and is characterized in that the inclination of a document relative to the locus of beam scan is detected. Specifically, as shown in FIG. 32, an inclination detecting circuit 58 determines the inclination of a document on the basis of the differences between the symmetrical light-sensitive regions of the photosensor 36.

Figure 33:
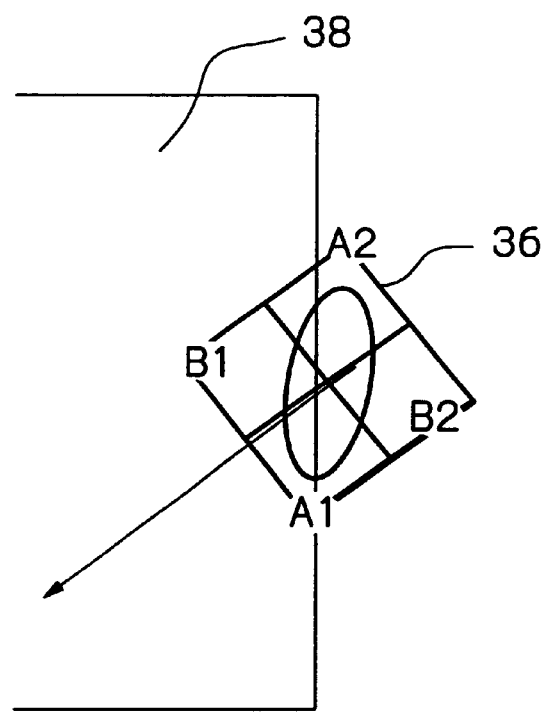
FIG. 33 shows a specific condition in which the locus of a scanning beam is incident to a document.
Figure 34:
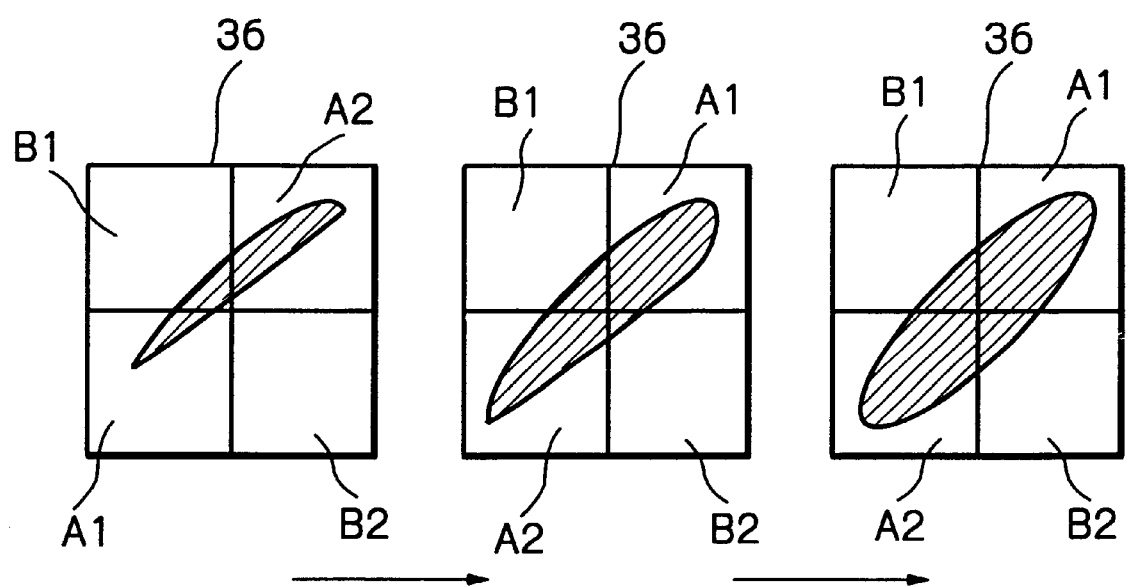
FIG. 34 shows how a light image incident to a photosensor varies in the condition of FIG. 33.
Figure 35:
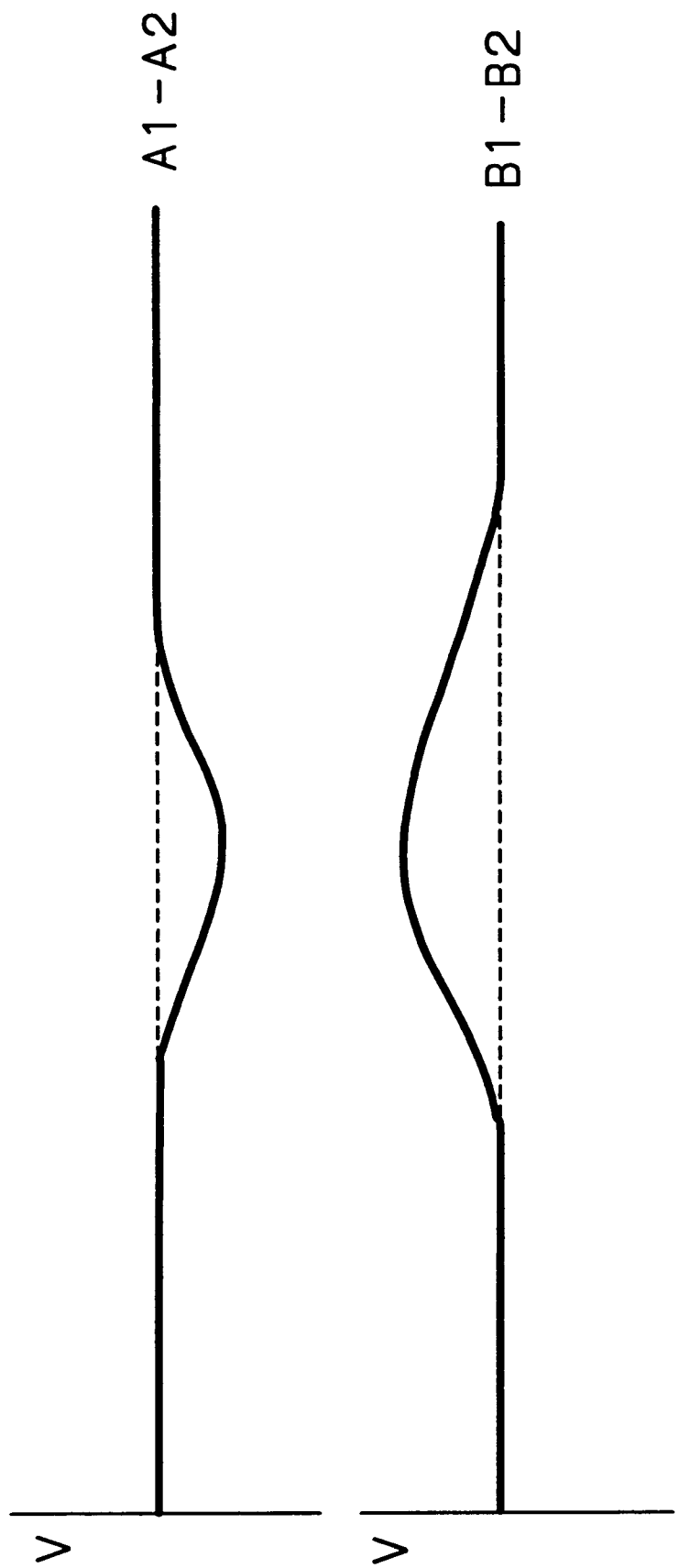
FIG. 35 shows waveforms representative of signals output from subtracters shown in FIG. 32 in the condition of FIG. 33.

The operation of the seventh embodiment is as follows. When the locus of beam scanning is incident to the document 38 in a specific condition shown in FIG. 33, the image incident to the photosensor 36 sequentially varies in the manner shown in FIG. 34. In FIG. 33, the photosensor 36 is representative of the direction of movement of the image incident thereto and the shape of the astigmatic beam derived from the reflection from the document 38. When scanning proceeds in the direction indicated by an arrow in FIG. 33, the image incident to the photosensor 36 sequentially appears from the direction of B1, as shown in FIG. 34. At this instant, as shown in FIG. 35, the signal (A1−A2) varies to the negative side with a small amplitude while the signal (B1−B2) varies to the positive side with a large amplitude.

Figure 36:
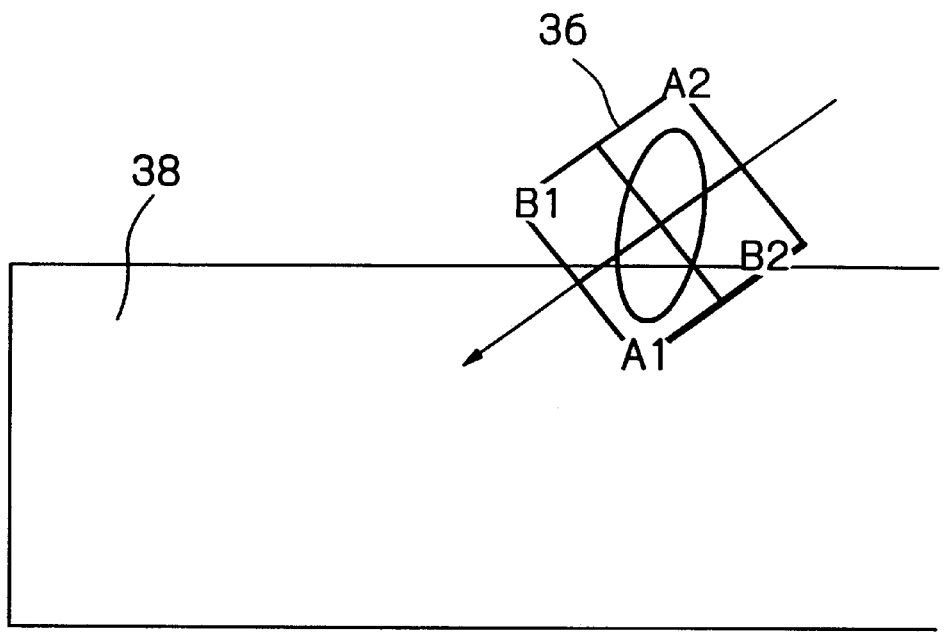
FIG. 36 shows a condition in which the beam scanning direction is the same as in FIG. 33, but the direction of document edges is rotated by 90 degrees.
Figure 37:
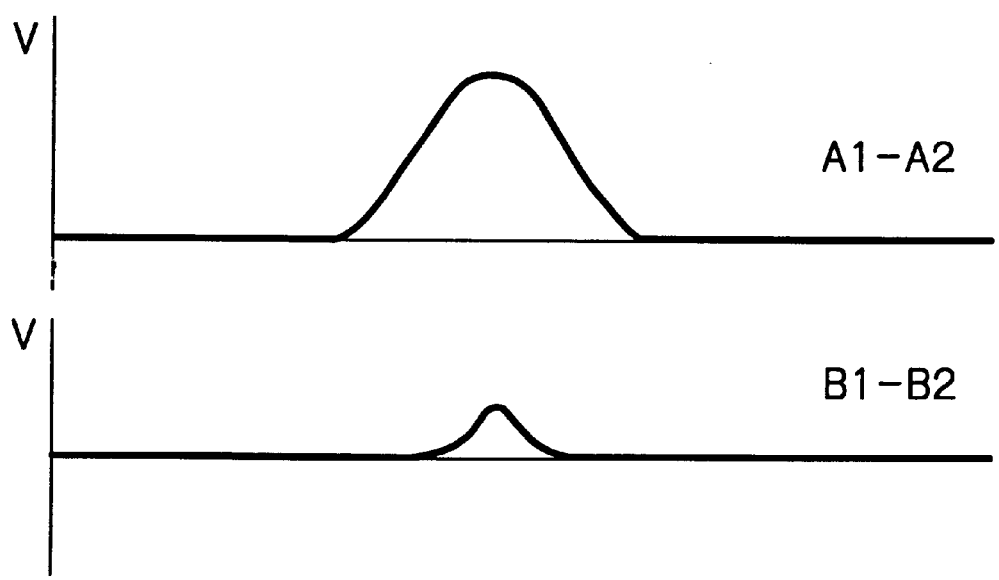
FIG. 37 shows waveforms representative of signals output from the subtracters of FIG. 32 in the condition of FIG. 36.

As shown in FIG. 36, assume that the beam scanning direction is the same, but the direction of document edges is rotated by 90 degrees. Then, as shown in FIG. 37, the signal (A1−A2) varies to the positive side with a large amplitude while the signal (B1−B2) varies with a small amplitude. in this manner, the difference signals (A1−A2) and (B1−B2) relating to the diagonal components of the photosensor 36 vary in a different way, depending on the beam scanning direction and the orientation of the edges of a document. It is therefore possible to alert the operator to the position of the document inclined relative to the reference position or to electrically correct the inclination by circuitry included in the apparatus.

An eighth embodiment of the present invention will be described with reference to FIGS. 38A–41B. This embodiment relates to the arrangement of the light receiving means used to determine a distance. In the illustrative embodiment, the optical element and photosensor are arranged such that the longitudinal direction of the astigmatic beam derived from the reflection from the document is perpendicular to the direction of movement of the image on the photosensor.

Figure 38A:
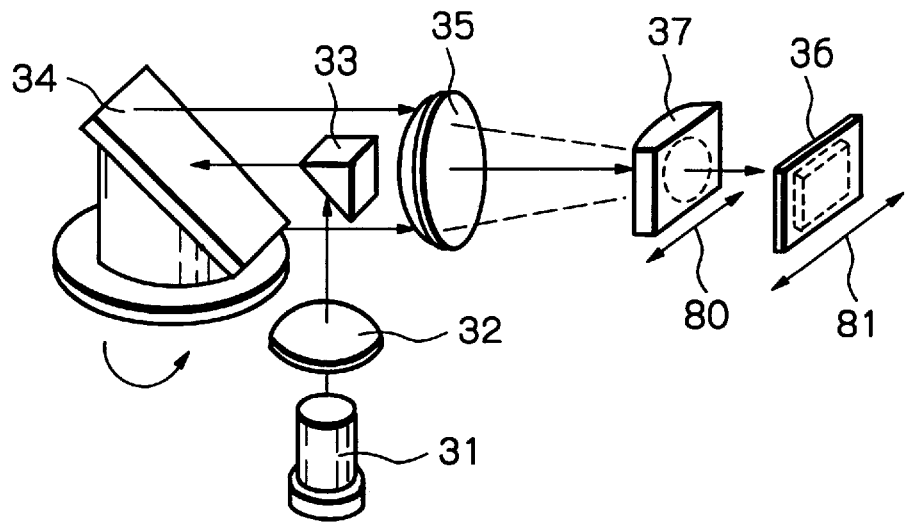
FIGS. 38A and 38B show an eighth embodiment of the present invention.
Figure 38B:
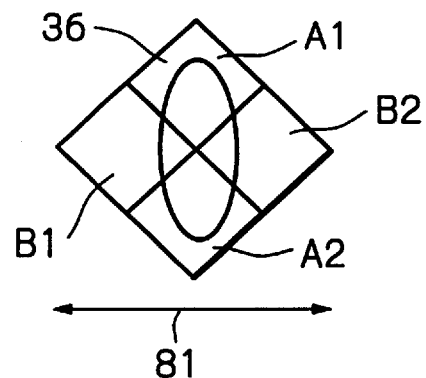

Specifically, as shown in FIGS. 38A and 38B, the scanning section 34 is implemented by a mirror scanner. In this case, the image moves across the photosensor 36 horizontally in a direction 81, as seen from the center of the optical axis. The cylindrical lens 37 for generating astigmatism is positioned such that a direction 80 in which the condensing effect of the lens 37 is available is coincident with the direction 81. In this arrangement, the reflection from a document propagated through a short optical path and the reflection from a cover plate propagated through a long optical path respectively form a vertically long astigmatic beam spot and a horizontally long astigmatic beam spot.

Figure 39:
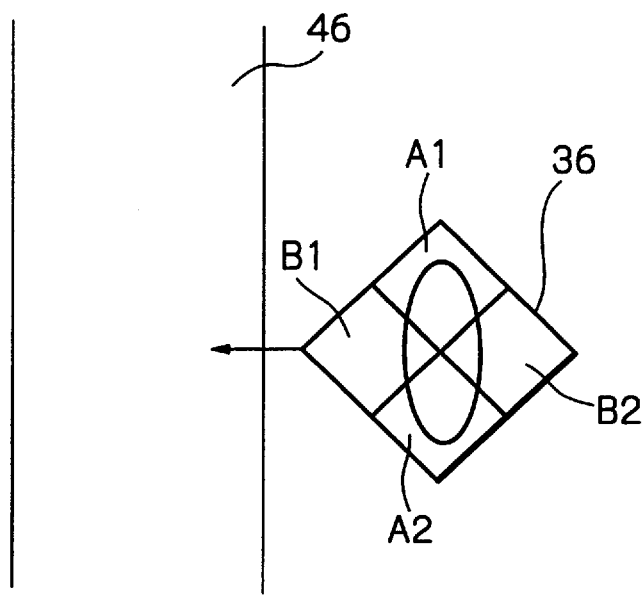
FIG. 39 shows a specific condition in which the image of disturbing light moves across the light-sensitive surface of a photosensor.
Figures 40A, 40B:
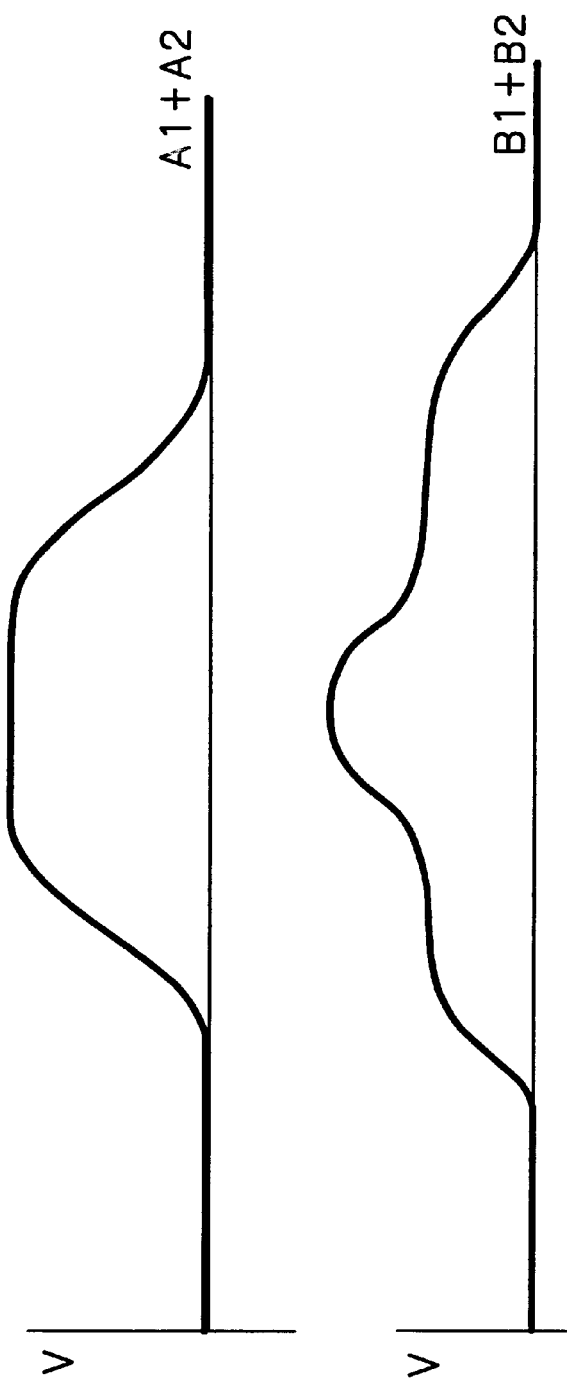
FIGS. 40A and 40B shows waveforms (A1+A2) and (B1+B2) output from the photosensor in the condition of FIG. 39.
Figures 41A, 41B:
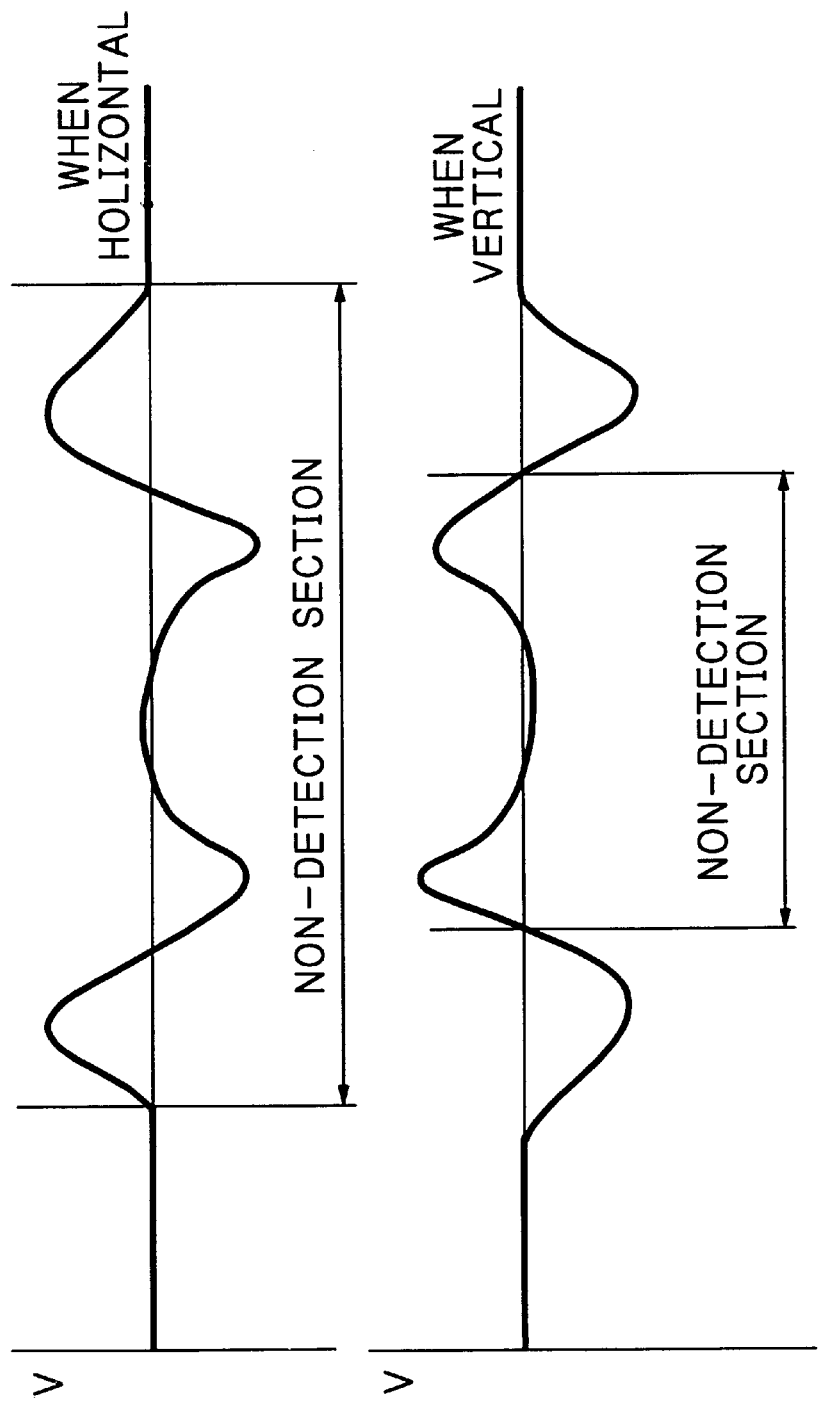
FIGS. 41A and 41B show distance signals respectively appearing, in the condition of FIG. 39, when the direction of astigmatism is horizontal and when it is vertical.

In operation, assume that the image 46 of disturbing light moves across the photosensor 36, as shown in FIG. 39. Then, the sum signals (A1+A2) and (B1+B2) output from the photosensor 34 vary, as shown in FIGS. 40A and 40B. respectively. FIGS. 41A and 41B show how the distance signal (A1+A2)−(B1+B2) varies when the direction of astigmatism is horizontal and when it is vertical, respectively. As FIGS. 41A and 41B indicate, the section in which the signal derived from the disturbing light and causative of erroneous detection appears at the positive side is shorter when astigmatism is vertical than when it is horizontal. It follows that by orienting the optical device such that the longitudinal direction of the astigmatic beam derived from a reflection from a document is perpendicular to the direction of movement of the image on the photosensor, it is possible to reduce the section in which noise ascribable to the disturbing Light appears, and therefore to realize stable document sensing.

Figure 42:
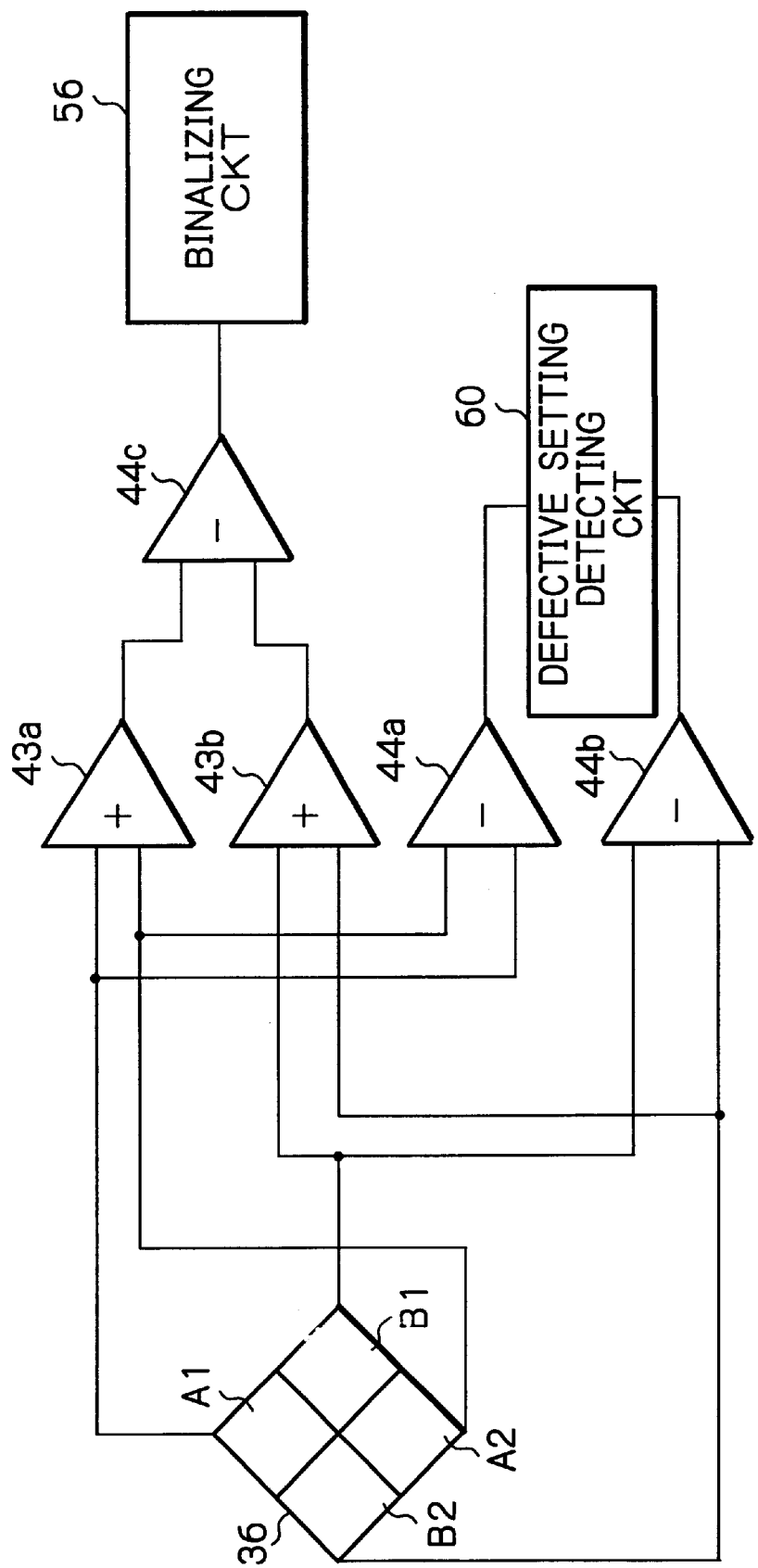
FIGS. 42 and 43 are block diagrams each schematically showing another specific configuration of the circuitry for performing calculation with the outputs of the photosensor.

FIG. 42 shows a ninth embodiment of the present invention As shown, this embodiment is characterized by a defective setting detecting circuit 60. This circuit 60 detects defective setting on the basis of the difference signals derived from the diagonal light-sensitive regions of the photosensor.

So long as disturbing light is absent and each optical device is correctly set, the beam spot formed on the photosensor for detecting a distance by the astigmatism method varies symmetrically in both of the vertical and horizontal directions with respect to the intersecting point of the division lines, as stated earlier. In this condition, no difference signals relating to the diagonal components appear. However, when the setting of any one of the optical devices is defective, the difference signals appear even if disturbing light is absent. The illustrative embodiment observes the difference signals in order to detect outputs above a preselected level in the absence of disturbing light, thereby detecting defective setting. In this manner, by using the output of the defective setting detecting circuit 60, it is possible to determine whether or not adjustment is acceptable at the time of assembly or to find malfunction ascribable to defective adjustment after shipment.

Figure 43:
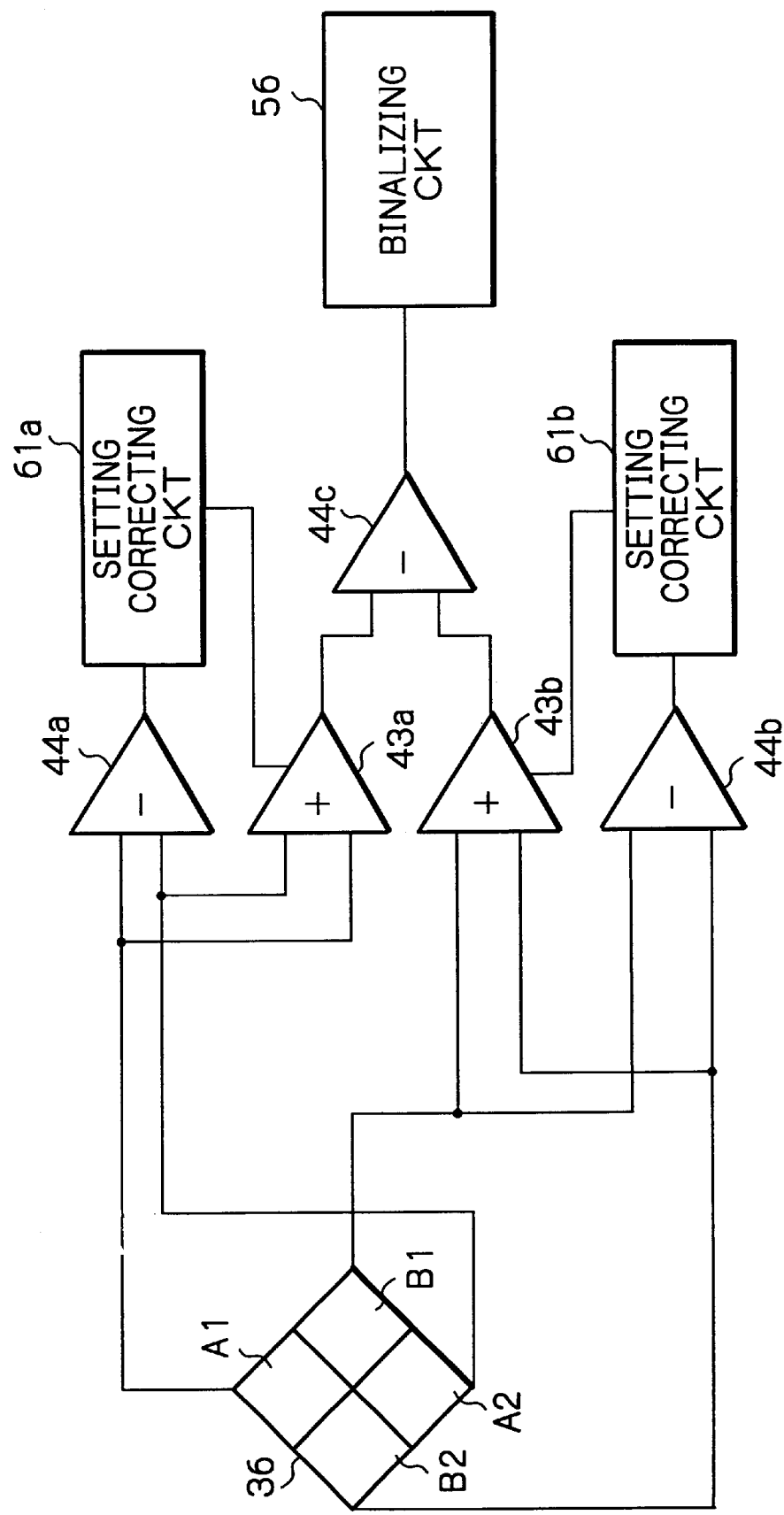

FIG. 43 shows a tenth embodiment of the present invention. As shown, this embodiment is characterized by setting correcting circuits 61a and 61b. These circuits 61a and 61b receive the difference signals (A1−A2) and (B1−B2), respectively, and electrically correct any defective setting represented by the difference signals. Because this embodiment corrects setting when the difference signals are present, correction signals output from the circuits 61a and 61b should preferably be input to the adders 43a and 43b, respectively.

For the correction of defective setting, the amplification ratios of the adders 43a and 43b may be adjusted. Specifically, assume that disturbing light is absent, but the outputs of the subtracters 44a and 44b are present. Then, the major cause of such an occurrence is a deviation in the setting of any one of the optical elements of the light receiving or distance determining means or an error in the circuit constant of a circuit for executing amplification and arithmetic operation with the outputs of the photosensor. This kind of deviation or error can be corrected if the amplification ratios of the adders 43a and 43b are adjusted in accordance with the difference signals.

Correction using the setting correcting circuits 61a and 61b enhances easy adjustment at the time of assembly and reduces the cost of circuit parts.

Referring to FIGS. 44A–44D, an eleventh embodiment of the present invention will be described. Disturbing Light can be removed to a certain extent if the direction of beam scanning is coincident with the division line of the photosensor. However, as shown in FIGS. 44A–44D, the image 46 scanning the photosensor 36 is sometimes inclined due to, e.g., the location of the apparatus in a room. Even in such a condition, the eleventh embodiment allows the angle of the photosensor 36 to be adjusted later in order to obviate the influence of disturbing light. Specifically, the photosensor 36 (indicated by a dotted line in FIG. 44A) is affixed to a jig rotatable about the optical axis of the received light. The jig is rotated in accordance with the inclination of the image 46 in order to bring the photosensor 36 to a position indicated by a solid line in FIG. 44A.

Figure 44A:
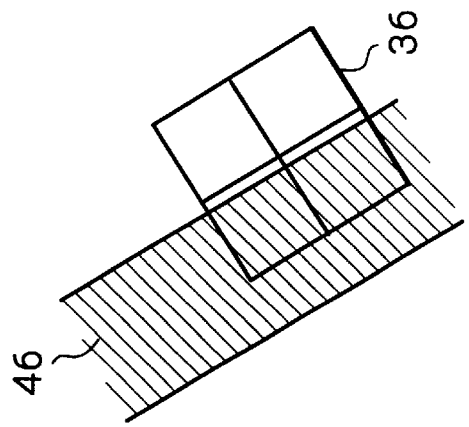
FIGS. 44A–44D show a relation between the movement of an image ascribable to, e.g., a fluorescent lamp and the output signal.
Figure 44B:
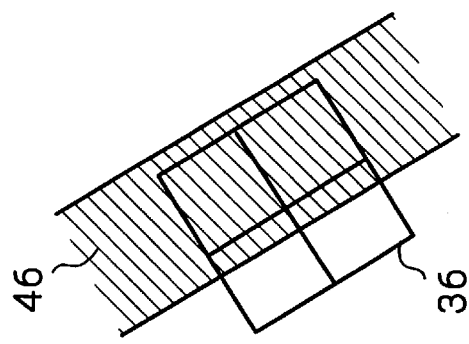
Figure 44C:
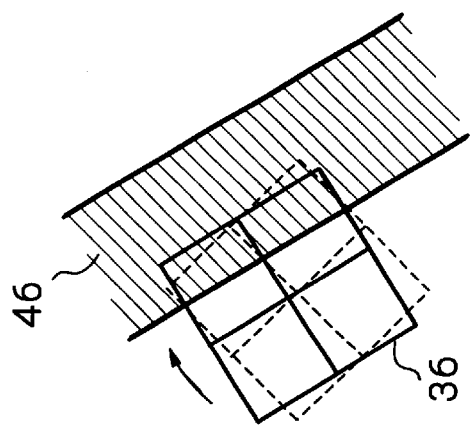
Figure 44D:
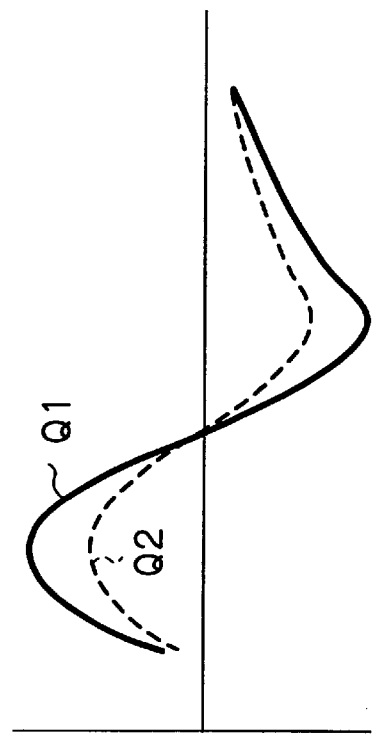

FIG. 44D shows how the output of the photosensor 36 derived from the beam scanning varies. As shown, the photosensor 36 produces an output Q1 when held in its usual position or produces an output Q2 when rotated. In this manner, because the astigmatism method produces a detection signal by use of a threshold, adjustment can be made even when the signal intensity varies due to the rotation of the photosensor 36, without resorting to the modification or adjustment of the other structural elements.

Figure 45A:
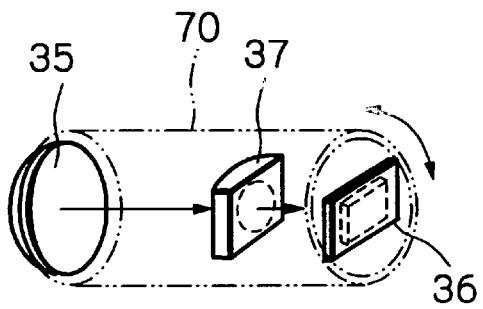
FIGS. 45A and 45B each shows a specific arrangement in which an optical device or optical devices including a lens are affixed to a hollow cylindrical holder.
Figure 45B:
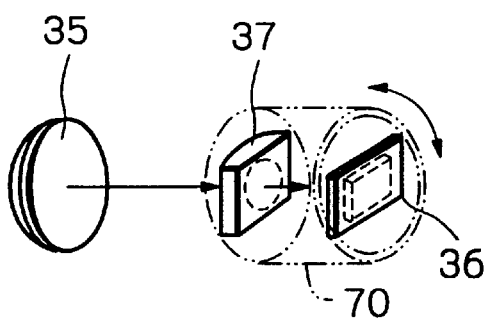

FIGS. 45A and 45B show a twelfth embodiment of the present invention As shown in FIG. 45A, the condenser 35, cylindrical lens 37 and photosensor 36 are affixed to a hollow cylindrical holder 70 rotatable about the optical axis. In this configuration, the condenser 35, cylindrical lens 37 and photosensor 36 are rotatable integrally with each other. Therefore, even when such a light receiving portion is rotated in order to obviate the influence of disturbing light, signals output from the photosensor 36 are not deteriorated. This is also true when only the cylindrical lens 37 and photosensor 36 are affixed to the holder 70. It is to be noted that the holder 70 does not have to be cylindrical. The crux is that the holder 70 be rotatable about the optical axis together with the condenser 35. lens 37, and photosensor 36.

Figure 46:
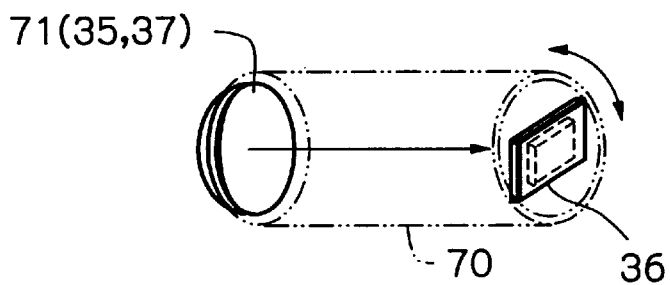
FIG. 46 shows a specific configuration of a lens.

FIG. 46 shows a thirteenth embodiment of the present invention. As shown, the lenses 35 and 37 are molded integrally with each other in the form of a single lens 71. While the lens 71 may be formed by simply adhering the lenses 35 and 37, it is preferable to mold it from the accuracy and easy treatment standpoint. The lens 71 is affixed to a hollow cylindrical holder 70 together with the photosensor 36.

Figure 47:
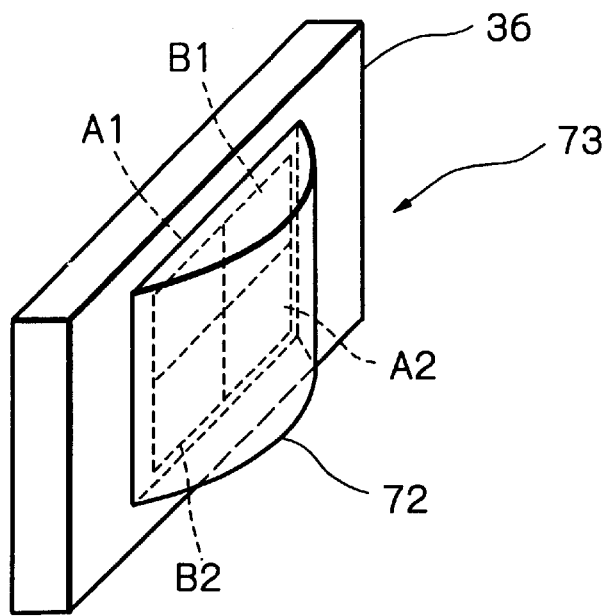
FIG. 47 shows a specific configuration of a photosensor having, e.g., a cylindrical lens on its light-sensitive surface.

FIG. 47 shows a fourteenth embodiment of the present invention. As shown, a cylindrical lens 72 or an element having the effect of a cylindrical lens is adhered to the light-sensitive surface (regions A1–B2) of the photosensor 36. The photosensor 36 with the cylindrical lens or similar element 72 is generally designated by the reference numeral 73. Because a photosensor is usually packaged with resin, it is preferable to implement the cylindrical lens by a part of a package.

As stated above, the fourth to fourteenth embodiments achieve various unprecedented advantages, as follows.

(1) A signal ascribable to disturbing light, i.e., an illuminator can be clearly distinguished from a signal representative of a document and excluded.

(2) A document can be continuously sensed with accuracy, so that the resulting signal is free from deterioration ascribable to disturbing light.

(3) Erroneous sensing ascribable to disturbing light and other noise components is obviated, so that a document can be stably sensed.

(4) Even when the operator lays a document on a glass platen in an inclined position, the inclination of the document can be detected.

(5) The section in which noise ascribable to disturbing light appears can be reduced.

(6) Adjustment at the time of assembly and the detection of malfunction after shipment are facilitated.

(7) Circuitry for arithmetic operation can be implemented by inexpensive parts.

(8) The angle can be easily adjusted over a broad range in order to exclude the influence of disturbing light ascribable to a location in a room. In addition, the output signal is free from deterioration ascribable to adjustment.

(9) The number of parts is reduced to simplify the structure. This minimizes the portions needing operation for adjustment and thereby facilitates the angle adjustment against disturbing light.

Various modifications will become possible for those skilled in the art after receiving the teachings of the present disclosure without departing from the scope thereof.

What is claimed is:

1. A document sensing device comprising:
   a light source comprising an LED;
   shaping means for shaping light issuing from said light source to thereby form a narrow beam;
   scanning means for steering said beam with a rotating or a vibrating reflection member to thereby cause said beam to scan a document;
   optical isolator means for separating light reflected from the document and returning an illumination path on an optical path;
   condensing means for condensing the light separated by said optical isolator means;
   photoelectric transducing means for transforming the light condensed by said condensing means to a corresponding electric signal; and
   edge sensing means for sensing, based on the electric signal and a timing for scanning the document, edges of the document to thereby determine a size and a position of the document wherein,
   said condensing means and said photoelectric transducing means are held by jig rotatable about an optical axis of said optical path.

2. A document sensing device as claimed in claim 1, wherein said photoelectric transducing means and said edge sensing means use one of a knife edge method using a bisected photodiode, an astigmatism method using a quadrisected photodiode and either a wedge or a cylindrical lens, and a beam size method using a bisected circle-in-rectangle type photodiode.

3. A document sensing device as claimed in claim 1, wherein said optical isolator means comprises a transparent member including a mirror portion.

4. A document sensing device as claimed in claim 1, wherein said condensing means comprises at least a condenser and a cylindrical lens molded integrally with each other.

5. A document sensing device as claimed in claim 1, wherein said condensing means and said optical isolator means are molded integrally with each other.

6. A document sensing device as claimed in claim 5, wherein said optical isolator means comprises a portion for separating the light reflected from the document while reflecting the fight issuing from said light source.

7. A document sensing means as claimed in claim 6, wherein said portion comprises a projection projecting from said optical isolator and including a mirror.

8. A document sensing means as claimed in claim 1, wherein said LED has an emission area whose diameter is less than 0.1 mm inclusive.

9. A document sensing device comprising:
   a transparent glass platen to be loaded with a document;
   a cover plate openably covering the document laid on said glass platen;
   scanning means for causing a light beam to sequentially scan an underside of said cover plate and then the document;
   light receiving means for outputting, in response to light reflected from the document, a signal corresponding to a length of an incidence path; and signal processing means for electrically processing the signal output from said light receiving means to thereby binarize said signal;

said light receiving means comprising photosensor means having at least four light-sensitive regions arranged symmetrically with respect to a center of said photosensor means, a condenser adjoining a front of said photosensor means on an optical axis of said photosensor means for condensing incident light to a single point, and one of a cylindrical lens or an optical wedge;

said signal processing means comprising at least one circuit for determining that signals derived from at least two symmetrical ones of said at least four light-sensitive regions of said photosensor means are different in strength wherein, said condenser, said photosensor means and one of said cylindrical lens or said optical wedge are held by a jig rotatable about said optical axis.

10. A document sensing device as claimed in claim 9, wherein said signal processing means comprises at least one calculating circuit for outputting an absolute value of a difference in strength between the signals derived from said at least two symmetrical light-sensitive regions.

11. A document sensing device as claimed in claim 9, wherein said signal processing means comprises at least one threshold setting circuit for setting a threshold for binarization by using a difference in strength between signals derived from said at least two symmetrical light-sensitive regions.

12. A document sensing device as claimed in claim 9, wherein at least one difference in strength between signals derived from said at least two symmetrical light-sensitive regions is detected to determine that the document laid on said glass platen is inclined with respect to a locus of beam scanning.

13. A document sensing device as claimed in claim 9, wherein said photosensor means and either said cylindrical lens or said optical wedge are arranged such that a spreading direction of astigmatism of light reflected from the document, which should be sensed by said cylindrical lens or said optical wedge, is perpendicular to a direction in which an image incident to said photosensor means moves due to scanning of said scanning means.

14. A document sensing device as claimed in claim 9, further comprising a defective setting detecting circuit for detecting defective setting of said light receiving means when a signal representative of a difference in strength between signals derived from said two symmetrical light-sensitive regions continues over a preselected period of time.

15. A document sensing device as claimed in claim 9, further comprising a setting correcting circuit for detecting defective setting of said light receiving means when a signal representative of a difference in strength between signals derived from said two symmetrical light-sensitive portions of said photosensor means continues over a preselected period of time, and correcting the defective setting to thereby allow the document to be accurately sensed by electrical processing.

16. A document sensing device comprising:
a light emitting portion for emitting light; and
a light receiving portion for receiving a reflection from a document illuminated by the light issuing from said light emitting portion;

said light receiving portion comprising a condenser for condensing the reflection, a cylindrical lens to which light output from said condenser is incident, and light receiving means for receiving light output from said cylindrical lens, said light receiving means having at least four light-sensitive regions so divided by lines as to be symmetrical with respect to a center of said light receiving means, said lines being perpendicular or parallel to a direction in which the reflection moves across the light-receiving means wherein, said condenser, said cylindrical lens and said light receiving means are held by a jig rotatable about an optical axis of incident light.

17. A document sensing device as claimed in claim 16, wherein said condenser and said cylindrical lens are implemented as a single lens.

18. A document sensing device as claimed in claim 16, wherein said light receiving means is adhered to said cylindrical lens or implemented by a package having a function of a cylindrical lens.

19. A document sensing device comprising:
a light source comprising an LED;
shaping means for shaping light issuing from said light source to thereby form a narrow beam;
scanning means for steering said beam with a rotating or a vibrating reflection member to thereby cause said beam to scan a document;
optical isolator means for separating light reflected from the document and returning an illumination path on an optical path;
condensing means for condensing the light separated by said optical isolator means;
photoelectric transducing means for transforming the light condensed by said condensing means to a corresponding electric signal; and
edge sensing means for sensing, based on the electric signal and a timing for scanning the document, edges of the document to thereby determine a size and a position of the document wherein,
said photoelectric transducing means contains light receiving means having at least four light-sensitive regions so divided by lines as to be symmetrical with respect to a center line of said light receiving means, said lines being perpendicular or parallel to a direction in which the light reflected from the document moves across the light receiving means, wherein
said light receiving means is rotatable about an optical axis of incident light in order to ensure said lines are perpendicular or parallel to said direction in which the reflected light moves across the light receiving means so as to distinguish said edges of the document from a disturbing light.

20. A document sensing device comprising:
a transparent glass platen to be loaded with a document;
a cover plate openably covering the document laid on said glass platen;
scanning means for causing a light beam to sequentially scan an underside of said cover plate and then the document;
light receiving means for outputting, in response to light reflected from the document, a signal corresponding to a length of an incidence path; and
signal processing means for electrically processing the signal output from said light receiving means to thereby binarize said signal;

said light receiving means comprising photosensor means having at least four light-sensitive regions arranged symmetrically with respect to a center of said photosensor means, a condenser adjoining a front of said photosensor means on an optical axis of said photosensor means for condensing incident light to a single point, and one of a cylindrical lens or an optical wedge;

said signal processing means comprising at least one circuit for determining that signals derived from at least two symmetrical ones of said at least four light-sensitive regions of said photosensor means are different in strength, wherein said photosensor means is rotatable about an optical axis of incident light in order to ensure that lines dividing the light-sensitive regions are perpendicular or parallel to a direction in which the reflected light moves across the photosensor means so as to distinguish edges of said document from a disturbing light.

* * * * *